(12) United States Patent
Evans et al.

(10) Patent No.: US 12,180,936 B2
(45) Date of Patent: Dec. 31, 2024

(54) SYSTEMS AND METHODS FOR OPERATING A WIND FARM

(71) Applicant: General Electric Renovables Espana, S.L., Barcelona (ES)

(72) Inventors: Scott Charles Evans, Burnt Hills, NY (US); Samuel Bryan Shartzer, Greenville, SC (US); Tapan Ravin Shah, Stanford, CA (US); Srinivas Bollapragada, Niskayuna, NY (US); Arunvenkataraman Subramanian, Dublin, CA (US); Philip James Verzella, Gray Court, SC (US); Stefan Kern, Munich (DE); Samuel Davoust, Garching (DE)

(73) Assignee: General Electric Renovables Espana, S.L., Barcelona (ES)

( * ) Notice: Subject to any disclaimer, the term of this patent is extended or adjusted under 35 U.S.C. 154(b) by 778 days.

(21) Appl. No.: 17/386,622

(22) Filed: Jul. 28, 2021

(65) Prior Publication Data

US 2023/0034766 A1 Feb. 2, 2023

(51) Int. Cl.
*F03D 17/00* (2016.01)
*F03D 7/02* (2006.01)
*F03D 7/04* (2006.01)

(52) U.S. Cl.
CPC ............. *F03D 7/028* (2013.01); *F03D 7/045* (2013.01); *F03D 7/046* (2013.01); *F03D 7/048* (2013.01);
(Continued)

(58) Field of Classification Search
CPC .......... F03D 7/028; F03D 17/00; F03D 7/045; F03D 7/046; F03D 7/048; F05B 2270/204;
(Continued)

(56) References Cited

U.S. PATENT DOCUMENTS

| 6,320,272 B1 | 11/2001 | Lading et al. |
| 6,924,565 B2 | 8/2005 | Wilkins et al. |

(Continued)

FOREIGN PATENT DOCUMENTS

| CA | 3053618 A1 | 9/2018 |
| CN | 108448610 A | 8/2018 |

(Continued)

OTHER PUBLICATIONS

Jie Tian, Wind Turbine Power Curve Design for Optimal Power Generation in Wind Farms Considering Wake Effect (Year: 2017).*
(Continued)

*Primary Examiner* — John E Johansen
*Assistant Examiner* — Adam Carrero
(74) *Attorney, Agent, or Firm* — Dority & Manning, P.A.

(57) ABSTRACT

A system and method are provided for operating a wind farm includes determining a wind direction and identifying a turbine cluster, which is a subset of a plurality of wind turbines of the wind farm. The subset includes an upwind turbine and a downwind turbine that is affected by a wake emanating from the upwind turbine. The controller then determines a difference between a freestream maximal cluster power output and a wake-affected cluster power output for the turbine cluster. The controller determines a mitigation setpoint combination for the subset configured to establish a mitigated cluster power output. Based on the mitigation setpoint combination, an operating state of at least one wind turbine of the turbine cluster is changed.

16 Claims, 13 Drawing Sheets

(52) U.S. Cl.
CPC ...... *F03D 17/00* (2016.05); *F05B 2270/1033* (2013.01); *F05B 2270/204* (2020.08); *F05B 2270/321* (2013.01); *F05B 2270/329* (2013.01); *F05B 2270/404* (2013.01)

(58) Field of Classification Search
CPC ........ F05B 2270/1033; F05B 2270/321; F05B 2270/329; F05B 2270/404; F05B 2260/84; F05B 2260/821
USPC .......................................................... 703/9
See application file for complete search history.

(56) References Cited

U.S. PATENT DOCUMENTS

| | | | |
|---|---|---|---|
| 7,004,724 B2 | 2/2006 | Pierce et al. |
| 7,118,339 B2 | 10/2006 | Moroz et al. |
| 7,603,202 B2 | 10/2009 | Weitkamp |
| 7,804,184 B2 | 9/2010 | Yuan et al. |
| 7,839,024 B2 | 11/2010 | Cardinal et al. |
| 7,883,317 B2 | 2/2011 | Ormel et al. |
| 7,941,304 B2 | 5/2011 | Gundling |
| 7,987,067 B2 | 7/2011 | Harrison et al. |
| 8,025,476 B2 | 9/2011 | Zheng et al. |
| 8,050,899 B2 | 11/2011 | Gignuere et al. |
| 8,057,174 B2 | 11/2011 | Scholte-Wassink |
| 8,155,920 B2 | 4/2012 | Egedal |
| 8,239,071 B2 | 8/2012 | Lausen |
| 8,249,852 B2 | 8/2012 | Thulke |
| 8,269,361 B2 | 9/2012 | Egedal |
| 8,295,987 B2 | 10/2012 | Gadre et al. |
| 8,398,369 B2 | 3/2013 | Rebsdprf et al. |
| 8,495,911 B2 | 7/2013 | Andersen et al. |
| 8,587,140 B2 | 11/2013 | Egedal et al. |
| 8,712,593 B2 | 4/2014 | Bjertrup et al. |
| 8,774,949 B2 | 7/2014 | Ou |
| 8,821,108 B2 | 9/2014 | Nayebi et al. |
| 8,853,877 B1 | 10/2014 | Zalar et al. |
| 9,217,416 B2 | 12/2015 | Spruce et al. |
| 9,261,076 B2 | 2/2016 | Adballah et al. |
| 9,450,415 B2 | 9/2016 | Larsen et al. |
| 9,458,830 B2 | 10/2016 | Barker et al. |
| 9,466,032 B2 | 10/2016 | Dull et al. |
| 9,512,820 B2 | 12/2016 | Obrecht |
| 9,551,322 B2 | 1/2017 | Ambekar et al. |
| 9,605,558 B2 | 3/2017 | Perley et al. |
| 9,606,518 B2 | 3/2017 | Evans et al. |
| 9,644,612 B2 | 5/2017 | Evans et al. |
| 9,683,552 B2 | 6/2017 | Tiwari et al. |
| 9,739,262 B2 | 8/2017 | Wang et al. |
| 9,777,706 B2 | 10/2017 | Couchman et al. |
| 9,790,921 B2 | 10/2017 | Egedal et al. |
| 9,822,764 B2 | 11/2017 | Esbensen et al. |
| 9,831,810 B2 | 11/2017 | Achilles et al. |
| 9,991,771 B2 | 6/2018 | Zhu et al. |
| 10,041,475 B1 | 8/2018 | Badrinath et al. |
| 10,132,295 B2 | 11/2018 | Lund et al. |
| 10,241,170 B2 | 3/2019 | Piron et al. |
| 10,247,170 B2 | 4/2019 | Evans et al. |
| 10,288,037 B2 | 5/2019 | Cosack et al. |
| 10,360,500 B2 | 7/2019 | Kabul et al. |
| 10,371,124 B2 | 8/2019 | Wilson et al. |
| 10,393,093 B2 | 8/2019 | Gregg et al. |
| 10,487,804 B2 | 11/2019 | Evans et al. |
| 10,605,228 B2 | 3/2020 | Evans et al. |
| 10,666,076 B1 | 5/2020 | Kohn et al. |
| 10,711,767 B2 | 7/2020 | Lutjen et al. |
| 10,724,499 B2 | 7/2020 | Nayebi et al. |
| 10,731,630 B2 | 8/2020 | Tiwari et al. |
| 10,815,972 B2 | 10/2020 | Evans et al. |
| 2005/0253396 A1 | 11/2005 | Mikhail et al. |
| 2006/0255594 A1 | 11/2006 | Larsen |
| 2008/0086281 A1 | 4/2008 | Santos |
| 2009/0192868 A1 | 7/2009 | Rajiv et al. |
| 2009/0263245 A1 | 10/2009 | Shi |
| 2010/0014969 A1 | 1/2010 | Wilson et al. |
| 2010/0092292 A1 | 4/2010 | Nies et al. |
| 2010/0133827 A1 | 6/2010 | Huang et al. |
| 2010/0135789 A1 | 6/2010 | Zheng et al. |
| 2010/0140940 A1 | 6/2010 | Kammer |
| 2010/0152905 A1 | 6/2010 | Kusiak |
| 2010/0274400 A1 | 10/2010 | Ormel et al. |
| 2010/0274401 A1 | 10/2010 | Kjaer et al. |
| 2011/0020122 A1 | 1/2011 | Parthasarathy et al. |
| 2011/0049883 A1 | 3/2011 | Hatch et al. |
| 2011/0106680 A1 | 5/2011 | Vittal et al. |
| 2011/0145277 A1 | 6/2011 | Gadre et al. |
| 2011/0175353 A1 | 7/2011 | Egedal et al. |
| 2012/0053983 A1 | 3/2012 | Vittal et al. |
| 2012/0083933 A1 | 4/2012 | Subbu et al. |
| 2012/0226474 A1 | 9/2012 | Trejo Sanchez et al. |
| 2013/0073223 A1 | 3/2013 | Lapira et al. |
| 2013/0103202 A1 | 4/2013 | Bowyer et al. |
| 2013/0106107 A1 | 5/2013 | Spruce et al. |
| 2013/0166082 A1 | 6/2013 | Ambekar et al. |
| 2013/0184838 A1 | 7/2013 | Tchoryk, Jr. et al. |
| 2013/0255363 A1 | 10/2013 | Merida et al. |
| 2013/0287568 A1 | 10/2013 | Miranda |
| 2014/0003936 A1 | 1/2014 | Agarwal |
| 2014/0100703 A1 | 4/2014 | Dull et al. |
| 2014/0172329 A1 | 6/2014 | Zhang et al. |
| 2014/0241878 A1 | 8/2014 | Herrig |
| 2014/0328678 A1 | 11/2014 | Guadayol Roig |
| 2014/0356161 A1 | 12/2014 | Creaby |
| 2015/0050145 A1 | 2/2015 | Cosack et al. |
| 2015/0086357 A1 | 3/2015 | Gregg |
| 2015/0101401 A1 | 4/2015 | Ekanayake et al. |
| 2015/0152847 A1 | 6/2015 | Guadayol Roig |
| 2015/0211486 A1 | 7/2015 | de Boer |
| 2015/0214821 A1 | 7/2015 | Zhu et al. |
| 2015/0233348 A1 | 8/2015 | Hiremath et al. |
| 2015/0308416 A1 | 10/2015 | Ambekar et al. |
| 2015/0345476 A1 | 12/2015 | Gregg et al. |
| 2016/0032893 A1 | 2/2016 | Herrig et al. |
| 2016/0084224 A1 | 3/2016 | Tyber et al. |
| 2016/0084233 A1 | 3/2016 | Evans et al. |
| 2016/0169204 A1 | 6/2016 | Wang et al. |
| 2016/0222946 A1 | 8/2016 | Krings |
| 2016/0298607 A1 | 10/2016 | Gregg et al. |
| 2016/0333854 A1 | 11/2016 | Lund et al. |
| 2017/0122289 A1 | 5/2017 | Kristoffersen et al. |
| 2017/0268487 A1 | 9/2017 | Yang et al. |
| 2017/0306926 A1 | 10/2017 | Deshpande et al. |
| 2017/0328346 A1 | 11/2017 | Hales et al. |
| 2017/0328348 A1 | 11/2017 | Wilson et al. |
| 2017/0335827 A1* | 11/2017 | Wilson .................. F03D 17/00 |
| 2017/0350369 A1 | 12/2017 | Evans et al. |
| 2017/0370348 A1 | 12/2017 | Wilson et al. |
| 2018/0003153 A1 | 1/2018 | Damgaard |
| 2018/0030955 A1 | 2/2018 | Vaddi et al. |
| 2018/0223807 A1 | 8/2018 | Badrinath Krishna et al. |
| 2018/0307986 A1 | 10/2018 | Kabul et al. |
| 2018/0364694 A1 | 12/2018 | Watanabe et al. |
| 2019/0170119 A1 | 6/2019 | Nielsen |
| 2019/0203693 A1 | 7/2019 | Tiwari et al. |
| 2019/0278242 A1 | 9/2019 | Gervais |
| 2019/0287026 A1 | 9/2019 | Calmon et al. |
| 2019/0305703 A1 | 10/2019 | Holliday et al. |
| 2019/0317741 A1 | 10/2019 | Herr et al. |
| 2019/0317880 A1 | 10/2019 | Herr et al. |
| 2019/0324430 A1 | 10/2019 | Herzog et al. |
| 2019/0360469 A1 | 11/2019 | De Boer |
| 2020/0056589 A1 | 2/2020 | Evans et al. |
| 2020/0064788 A1 | 2/2020 | Hentschel et al. |
| 2020/0082043 A1 | 3/2020 | Chu et al. |
| 2020/0192306 A1 | 6/2020 | Virani et al. |
| 2020/0271093 A1 | 8/2020 | Grunnet et al. |
| 2020/0285738 A1 | 9/2020 | Tippenhauer et al. |
| 2020/0291921 A1 | 9/2020 | Ou |
| 2020/0291922 A1 | 9/2020 | Hovgaard et al. |
| 2020/0300227 A1 | 9/2020 | Evans et al. |
| 2020/0340450 A1 | 10/2020 | Grunnet et al. |

(56) References Cited

U.S. PATENT DOCUMENTS

| | | | |
|---|---|---|---|
| 2021/0262441 A1 | 8/2021 | Jacobsen | |
| 2021/0310461 A1* | 10/2021 | King | G05B 13/027 |
| 2021/0363969 A1 | 11/2021 | Egedal et al. | |

FOREIGN PATENT DOCUMENTS

| | | |
|---|---|---|
| CN | 109492777 A | 3/2019 |
| DE | 102016117191 A1 | 3/2018 |
| EP | 1269282 A1 | 1/2003 |
| EP | 2048562 B1 | 8/2009 |
| EP | 2213873 A1 | 8/2010 |
| EP | 2477086 A1 | 7/2012 |
| EP | 2518308 A1 | 10/2012 |
| EP | 2063110 B1 | 8/2015 |
| EP | 2582975 B1 | 8/2015 |
| EP | 3517774 A1 | 7/2019 |
| EP | 3527817 A1 | 8/2019 |
| EP | 3597907 A1 | 1/2020 |
| EP | 3724490 A1 | 10/2020 |
| WO | WO 01/73518 A1 | 10/2001 |
| WO | WO2012/019331 A1 | 2/2012 |
| WO | WO2013/152776 A1 | 10/2013 |
| WO | WO2017/139046 A1 | 8/2017 |
| WO | WO2017/174090 A1 | 10/2017 |
| WO | WO2017/211367 A1 | 12/2017 |
| WO | WO2017/211368 A1 | 12/2017 |
| WO | WO2018/121668 A1 | 7/2018 |
| WO | WO2018/198225 A1 | 11/2018 |
| WO | WO2019/158762 A1 | 8/2019 |
| WO | WO 2020/028578 A1 | 2/2020 |

OTHER PUBLICATIONS

Yu-Ting Wu, Modeling turbine wakes and power losses within a wind farm using LES: An application to the Horns Rev offshore wind farm (Year: 2014).*

Ahmad et al., Analysis of Two Onshore Wind Farms with a Dynamic Farm Controller, J. Park H.H. Law, Applied Energy, vol. 165, Nov. 2015, pp. 151-165.

Barthelmie et al., Meteorological Controls on Wind Turbine Wakes, XP011497220, Proceedings of the IEEE, vol. 101, No. 4, New York, Apr. 2013, pp. 1010-1019.

Beyer et al., Wake Effects in a Linear Wind Farm, XP008022903, Journal of Wind Engineering and Industrial Aerodynam, vol. 51, No. 3, May 1994, pp. 303-318.

Evans et al., Towards Wind Farm Performance Optimization through Empirical Models, 2014 IEEE Aerospace Conference, Big Sky, MT, Mar. 2014, pp. 1-12.

Evans et al., Wind Farm Performance Validation Through Machine Learning: Sector-wise Honest Brokers, 2015 IEEE Aerospace Conference, Big Sky, MT, 2015, pp. 1-8.

Leahy et al., Diagnosing Wind Turbine Faults Using Machine Learning Techniques Applied to Operational Data, 2016 IEEE International Conference on Prognostics and Health Management (ICPHM), Conference Ottawa, ON, Canada, Jun. 20, 2016-Jun. 22, 2016, pp. 1-8.

Marvuglia et al., Monitoring of Wind Farms' Power Curves Using Machine Learning Techniques, Applied Energy, vol. 98, Oct. 2012, pp. 574-583.

Morshedizadeh et al., Power Production Prediction of Wind Turbines Using a Fusion of MLP and ANFIS Networks, IET Renewable Power Generation, vol. 12, Issue 09, Jul. 9, 2018, pp. 1025-1033.

Ouyang et al., Monitoring Wind Turbines' Unhealthy Status: A Data-Driven Approach, IEEE Transactions on Emerging Topics in Computational Intelligence, Miami, FL, 2018, pp. 1-10.

Park et al., A Data-Driven, Cooperative Wind Farm Control to Maximize the Total Power Production, XP029400213, Applied Energy, Elsevier Science, vol. 165, No. 31, Dec. 2015, pp. 151-165.

Rasmussen et al., Gaussian Processes for Machine Learning, Jun. 29, 2010. Abstract Only.

Toubakh et al., Advanced Pattern Recognition Approach for Fault Diagnosis of Wind Turbines, 2013 12th International Conference on Machine Learning and Applications, 2013, pp. 368-373.

Vaccaro et al., An Adaptive Framework Based on Multi-Model Data Fusion for One-day-Ahead Wind Power Forecasting, Electric Power Systems Research, vol. 81, Issue 03, Mar. 2011, pp. 775-782.

EP Search Report for EP application No. 22182619.1, Dec. 16, 2022, 7 pages.

Ritter, Mathias, et al., Neighborhood Effects in Wind Farm Performance: A Regression Approach, Energies, vol. 10, Mar. 16, 2017, 16 pages.

* cited by examiner

SYSTEMS AND METHODS FOR OPERATING A WIND FARM

FIELD

The present disclosure relates in general to windfarms, and more particularly to systems and methods for operating the wind farm so as to mitigate reductions in power output to do wake effects.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Often, a number of wind turbines are used in conjunction with one another and are arranged as a wind farm. In such an arrangement, the wind impacting a downwind turbine may be affected by an upwind obstruction, such as an upwind turbine. When the downwind turbine is affected by the wake from an upwind turbine, the controller for the downwind turbine may seek to alter the setpoint for the downwind turbine in order to optimize the power production of the downwind turbine generated in response to the wake-affected wind. However, the optimization of the wake-affected downwind turbine without consideration of other wind turbines of the wind farm may result in a suboptimal power output for the wind farm for the given environmental conditions.

In view of the aforementioned, the art is continuously seeking new and improved systems and methods for operating a wind farm so as to mitigate reductions in power output due to wake effects.

BRIEF DESCRIPTION

Aspects and advantages of the invention will be set forth in part in the following description, or may be obvious from the description, or may be learned through practice of the invention.

In one aspect, the present disclosure is directed to a method for operating a wind farm having a plurality of wind turbines. The method may include determining a wind direction of a wind affecting the wind farm. The method may also include identifying, via a controller, a turbine cluster comprising a subset of the plurality of wind turbines when the wind has the determined wind direction. The subset of wind turbines may include at least an upwind turbine and a downwind turbine, and the downwind turbine may be affected by a wake emanating from the upwind turbine. Additionally, the method may include determining, via the controller, a difference between a freestream maximal cluster power output and a wake-affected cluster power output for the turbine cluster based, at least in part, on a given wind speed affecting the wind farm. In accordance with the method, the controller may determine a mitigation setpoint combination for the subset of wind turbines, the mitigation setpoint combination being configured to establish a mitigated cluster power output. The mitigated cluster power output may have a difference from the freestream maximal cluster power output that is less than the difference between the freestream maximal cluster power output and the wake-affected cluster power output for the turbine cluster. Further, the method may include changing an operating state of at least one wind turbine of the turbine cluster based on the mitigation setpoint combination.

In an additional aspect, the present disclosure is directed to a method for operating a wind farm having a plurality of wind turbines. The method may include determining a wind velocity of a wind affecting the wind farm and identifying at least one downwind turbine affected by a wake emanating from an upwind turbine for the wind velocity. The method may also include determining a modeled power output for the downwind turbine via a first model implemented by a controller. The modeled power output may be based, at least in part, on an operation of a designated grouping of wind turbines of the plurality of wind turbines. The designated grouping may be exclusive of the downwind turbine and may include a first portion of the plurality of wind turbines when the wind has a first wind velocity and a second portion of the plurality of wind turbines when the wind has a second wind velocity. The first and second portions may include at least one differing wind turbine of the plurality of wind turbines. Additionally, the method may include determining, via the controller, a power output differential for the downwind turbine at a plurality of sampling intervals when the wind affecting the wind farm has the wind velocity. The performance parameter differential may be indicative of a difference between the modeled power output and a monitored power output for the downwind turbine. The controller may also implement a second model to determine a predicted power output of the downwind turbine at each of a plurality of setpoint combinations based, at least in part, on the power output differential of the downwind turbine. The controller may also select a setpoint combination of the plurality of setpoint combinations based on the predicted power output, wherein the setpoint combination is a mitigation setpoint combination. Further, the method may include changing an operating state of the downwind turbine based on the mitigation setpoint combination.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
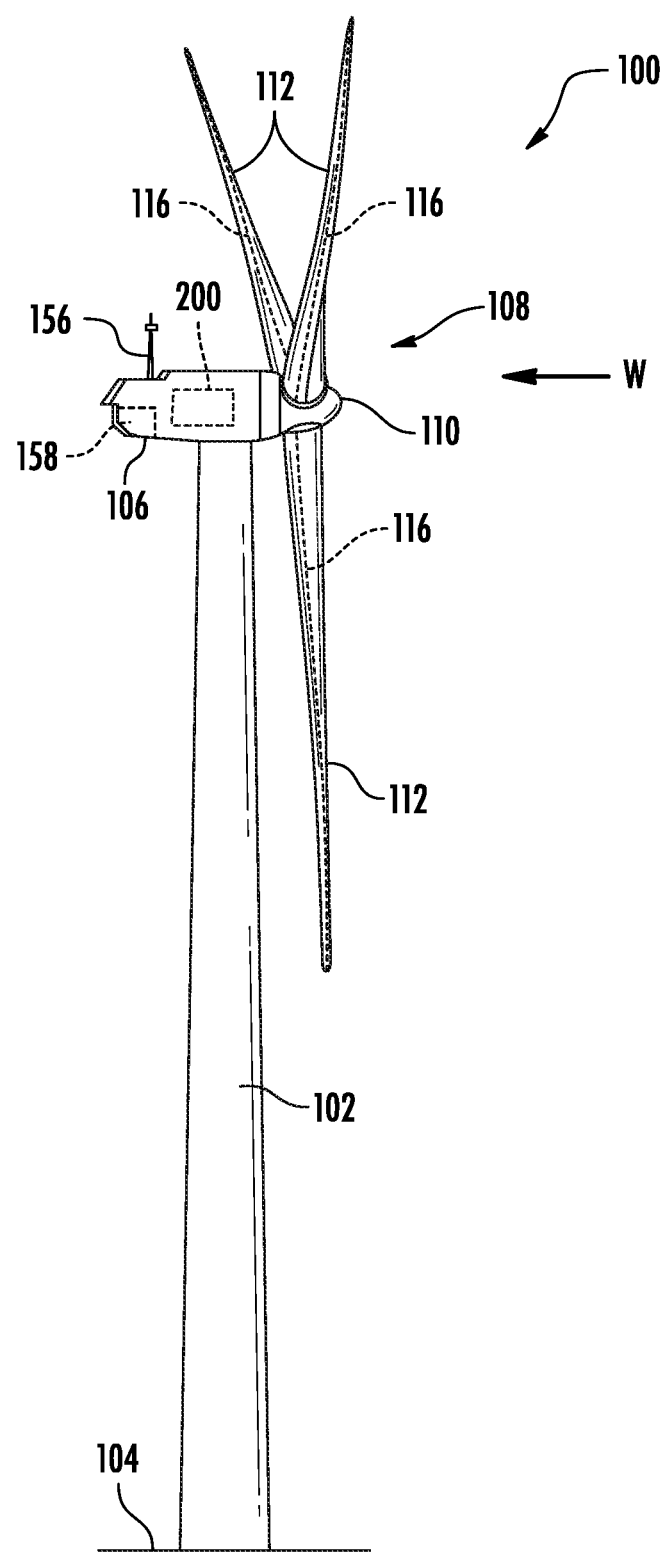
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind farm. In particular, the systems and methods may facilitate the optimization of the output of the wind farm when at least one wind turbine is affected by a wake emanating from another turbine. In other words, the systems and methods may be directed to the optimization of the power output of the wind farm when the wind impacting a downwind turbine differs from a freestream wind due to a wake generated by an upwind turbine when the wind has a given wind velocity (e.g., wind speed and wind direction). As such, the present disclosure may include systems and methods which facilitate the optimization of the operational setpoints for the downwind and/or upwind wind turbines (such as pitch, tip speed ratio (TSR), generator torque, and/or yaw setpoints) in order to maximize the power output for the wind farm for the given wind velocity when at least one wind turbine is subjected to wake effects.

In order to optimize (e.g., maximize) the power output of the wind farm particular, the systems and methods disclosed herein may determine at least a wind direction of the wind affecting the wind farm. Based on the wind direction, a turbine cluster may be identified. The turbine cluster may include at least one upwind turbine and one downwind turbine, though the turbine cluster may include additional downwind turbines (e.g., three or more turbines). The particular turbines of the turbine cluster may vary depending on the wind direction. For example, in a first wind direction, the downwind turbine may be affected by the wake emanating from a first upwind turbine, but in a second direction the downwind turbine is affected by a second upwind turbine, while the first upwind turbine does not affect the downwind turbine.

When the turbine cluster is identified for a particular wind direction, the optimization of the power output for the entire turbine cluster may take precedent over the optimization of the power output of any particular wind turbine of the turbine cluster. Thus, the power output of the wind farm may be optimized/maximized even though one or more wind turbines may be operating at less than a maximal power production setting for the given wind impacting the turbine. For example, when the upwind turbine is operated at maximal power setpoint for a given freestream wind velocity, the resultant wake impacting the downwind turbine may be significant. This may result in a substantial reduction in the power output of the downwind turbine. However, when the upwind turbine is operated in a manner that takes into account the effects of the wake on the downwind turbine, the power output of the upwind turbine may be somewhat reduced, but the power output of the downwind turbine may be significantly increased. As such, the combined power output of the upwind and downwind turbines (e.g., the turbine cluster) may be greater than would be achieved if each wind turbine were individually optimized for the wind conditions at each wind turbine.

In order to optimize/maximize the power output of the wind farm based on the power output of the turbine cluster, a freestream maximal cluster power output may be determined. The freestream maximal cluster power output may correspond to the combined freestream maximal turbine power outputs of each wind turbine of the turbine cluster. The freestream maximal turbine power output may be the maximal turbine power output for a given wind velocity when the wind is unobstructed by an upwind turbine, terrain feature, and/or other obstruction. In other words, the freestream maximal cluster power output may be the combination of the nominal power outputs of each wind turbine when no wind turbine is waked by an upwind turbine.

The impact of the wake on the downwind turbine may be reflected in the total power output of the turbine cluster. As such, a wake-affected cluster power output for the turbine cluster may also be determined. The wake-affected cluster power output may include at least the freestream maximal turbine power output of the upwind turbine and a wake-affected turbine power output of the downwind turbine. The wake-affected power output of the downwind turbine may correspond to a power output of the downwind turbine when each wind turbine of the turbine cluster is individually optimized for the wind conditions at the respective wind turbine. In other words, the wake-affected cluster power output may reflect the power output of the upwind turbine when the upwind turbine is optimized for the freestream wind velocity and the power output of the downwind turbine when the downwind turbine is optimized for the wake-affected conditions.

In order to optimize the power output of the turbine cluster, a mitigation setpoint combination for the wind turbines of the turbine cluster may be determined. Mitigation setpoint combination may be the combination of setpoints that establish a mitigated cluster power output. The mitigated cluster power output may be less than the freestream maximal cluster power output but more than the wake-affected cluster power output.

The mitigation setpoint combination may configure at least one wind turbine of the turbine cluster to generate less than a maximal power output than would otherwise be achievable for the given wind conditions at the wind turbine in order to optimize/maximize the overall power output of the turbine cluster. As such, the mitigation setpoint combination may include setpoints establishing the operating states of each wind turbine of the turbine cluster. For example, the mitigation setpoint combination may include a yaw offset for the upwind turbine so that the resultant wake is directed at least partially away from the downwind turbine. As an additional example, the upwind turbine may be operated in a de-powered mode in order to reduce the length of the wake downstream of the upwind turbine so that wake the dissipates and/or is weakened prior to contacting the downwind turbine. By way of additional example, in a three-turbine cluster, the second turbine may be downwind of one turbine and upwind of another. As such, the second turbine may be depowered so that the first and third turbines may be operated at a maximal power setpoint thereby increasing the overall power output of the turbine cluster above and output that would be achievable if all three turbines were configured to operate at a maximal power setpoint. It should be appreciated that the above examples are presented to aid in the understanding of the present disclosure and are not intended as limiting examples of the potential mitigation setpoint combinations.

In order to optimize (e.g., maximize) the power output of the wind farm in particular, the systems and methods disclosed herein may also identify at least one downwind turbine affected by a wake emanating from the upwind turbine for a given wind velocity. A controller may then determine a modeled power output for the downwind turbine via a first model. The modeled power output may be based on an operation of key reference turbines (e.g., designated groupings) for which there exists an optimal correlation between the key reference turbines performance and the performance of a turbine of interest (e.g., the downwind turbine). The correlation may facilitate the prediction of the performance of the turbine of interest based off the performance of the key reference turbines by the first model. This predicted performance may be compared to a monitored performance of the turbine of interest to determine a difference between the performance predicted based on the performance of reference turbines and the monitored performance. The ability of the turbine of interest to perform in a predictable manner relative to the reference turbines may then be utilized in the generation, training and/or employment of a second model. In particular, the second model may be employed to determine a predicted performance parameter for the turbine of interest at a number of potential setpoint combinations. The results of this modeling may then be employed to select and implement an optimal setpoint for the wind turbine for the given environmental conditions impacting the wind farm.

It should be appreciated that utilizing the performance of the key reference turbines to predict the power production of the turbine of interest may preclude a requirement that certain parameters the monitored at the turbine of interest. In other words, since the performance of the turbine of interest may be predicted based on the performance of the reference turbines, it may be unnecessary to monitor certain conditions affecting the turbine of interest. This may, in turn, reduce the sensor requirements, and therefore costs, for the wind farm. For example, the utilization of the performance of the reference turbines instead of directly monitored environmental conditions may eliminate a requirement for a meteorological mast, a lidar, or other sensor system disposed within the wind farm.

It should also be appreciated that the utilization of the performance differential as opposed to a direct measurement of the performance parameter may reduce the number of variables which must be accounted for by the control system. For example, calculations based on the power output of the turbine of interest may be subject to fluctuations in wind velocity. This may, thus, require the monitoring of wind velocity and make it more difficult to determine whether the power variations may be indicative of sub-optimal pitch and TSR setpoints.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 3:
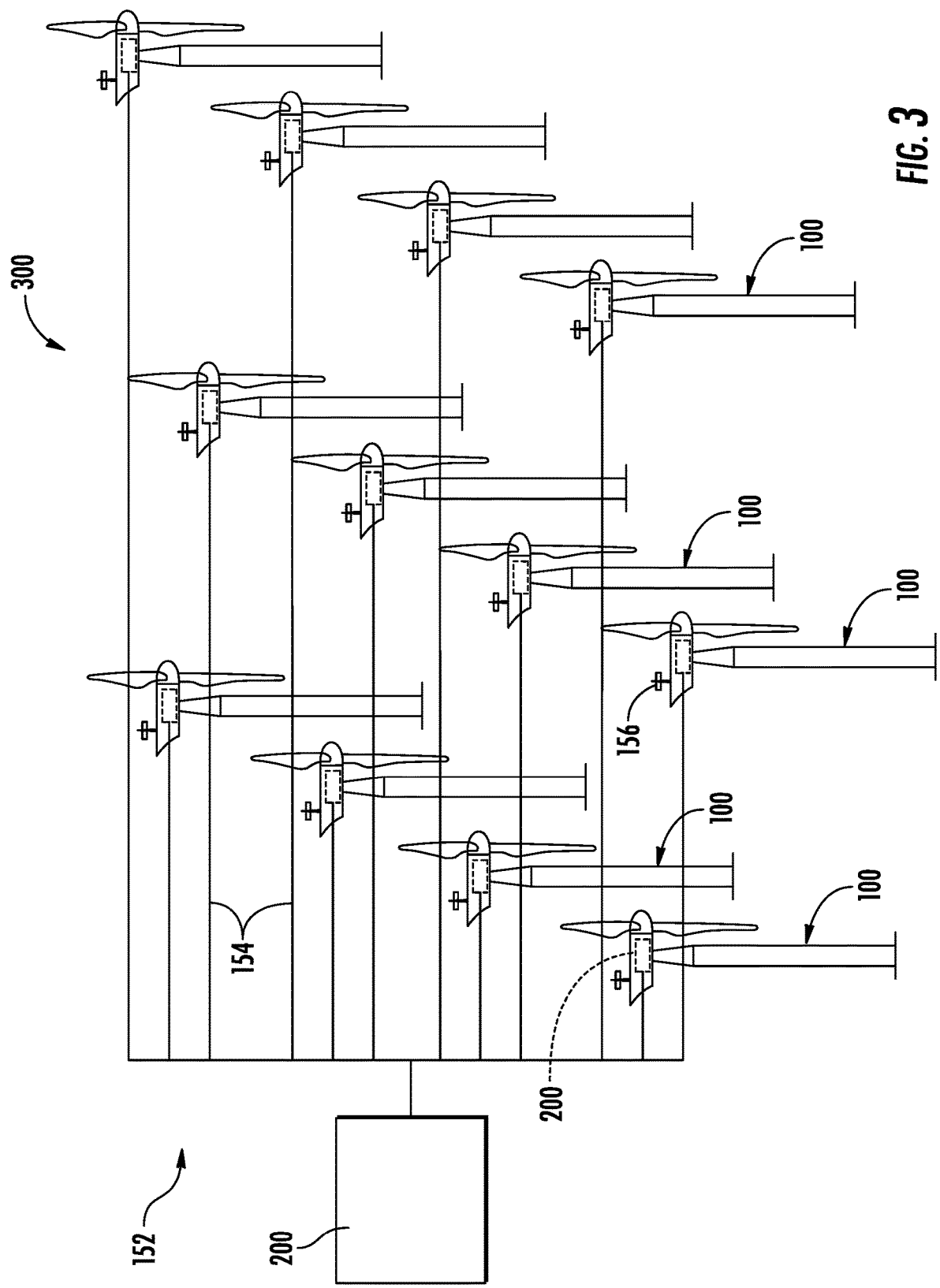
FIG. 3 illustrates a schematic diagram of one embodiment of a wind farm having a plurality of wind turbines according to the present disclosure.

The wind turbine 100 may also include a controller 200 configured as a turbine controller centralized within the nacelle 106. However, in other embodiments, the controller 200 may be located within any other component of the wind turbine 100 or at a location outside the wind turbine or the wind farm 152 (FIG. 3). For example, in an embodiment, the controller 200 may be a computing system configured to perform an offline analysis of the performance of the wind turbine 100. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as modeling, predicting, receiving, transmitting and/or executing wind turbine control signals (e.g., setpoints) and/or parameters.

Figure 2:
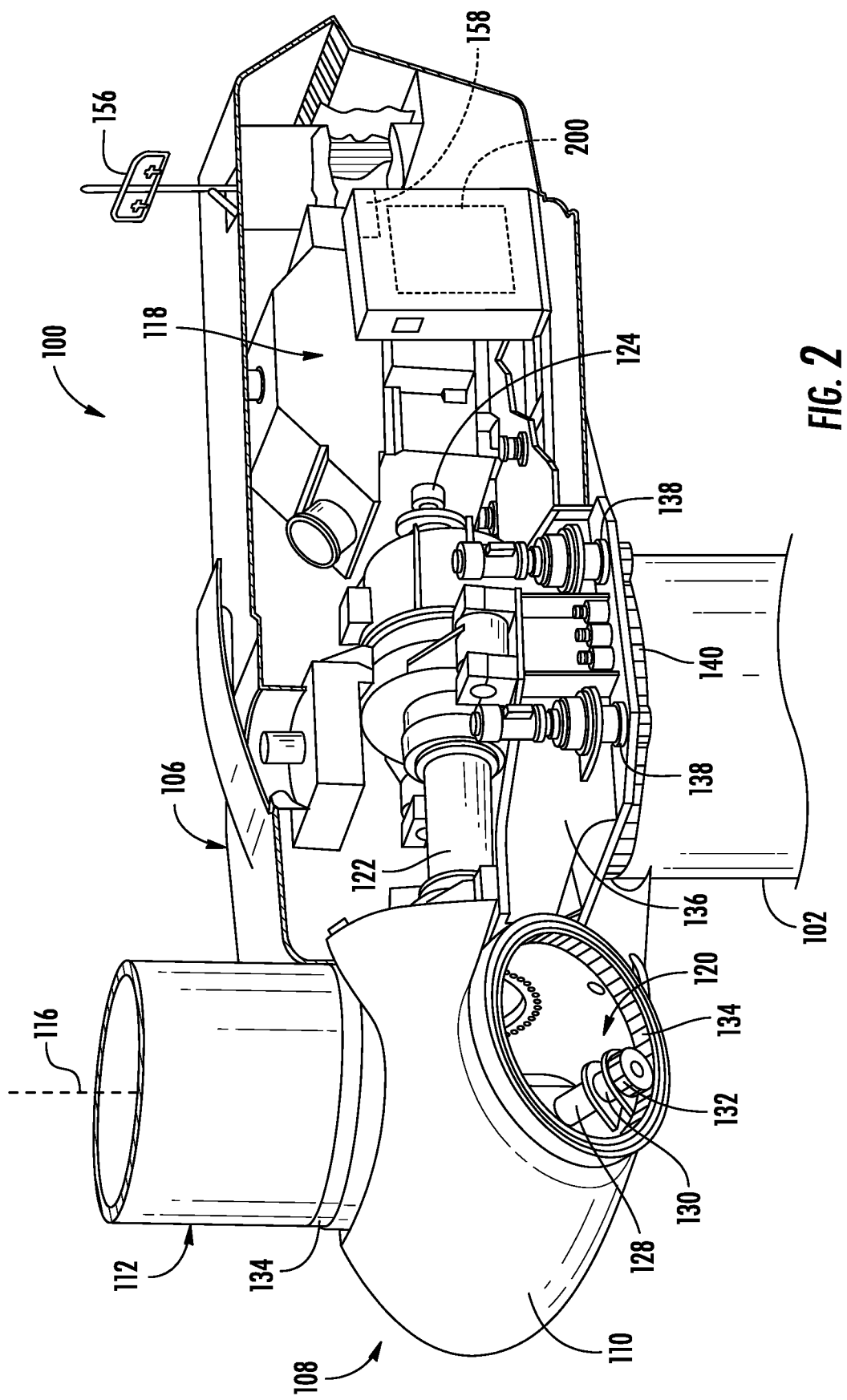
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 200. Further, each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100). It should be appreciated that the controller 200 may direct the yawing of the nacelle 106 and/or the pitching of the rotor blades 112 so as to aerodynamically orient the wind turbine 100 relative to a wind (W) acting on the wind turbine 100, thereby facilitating power production.

Figure 4:
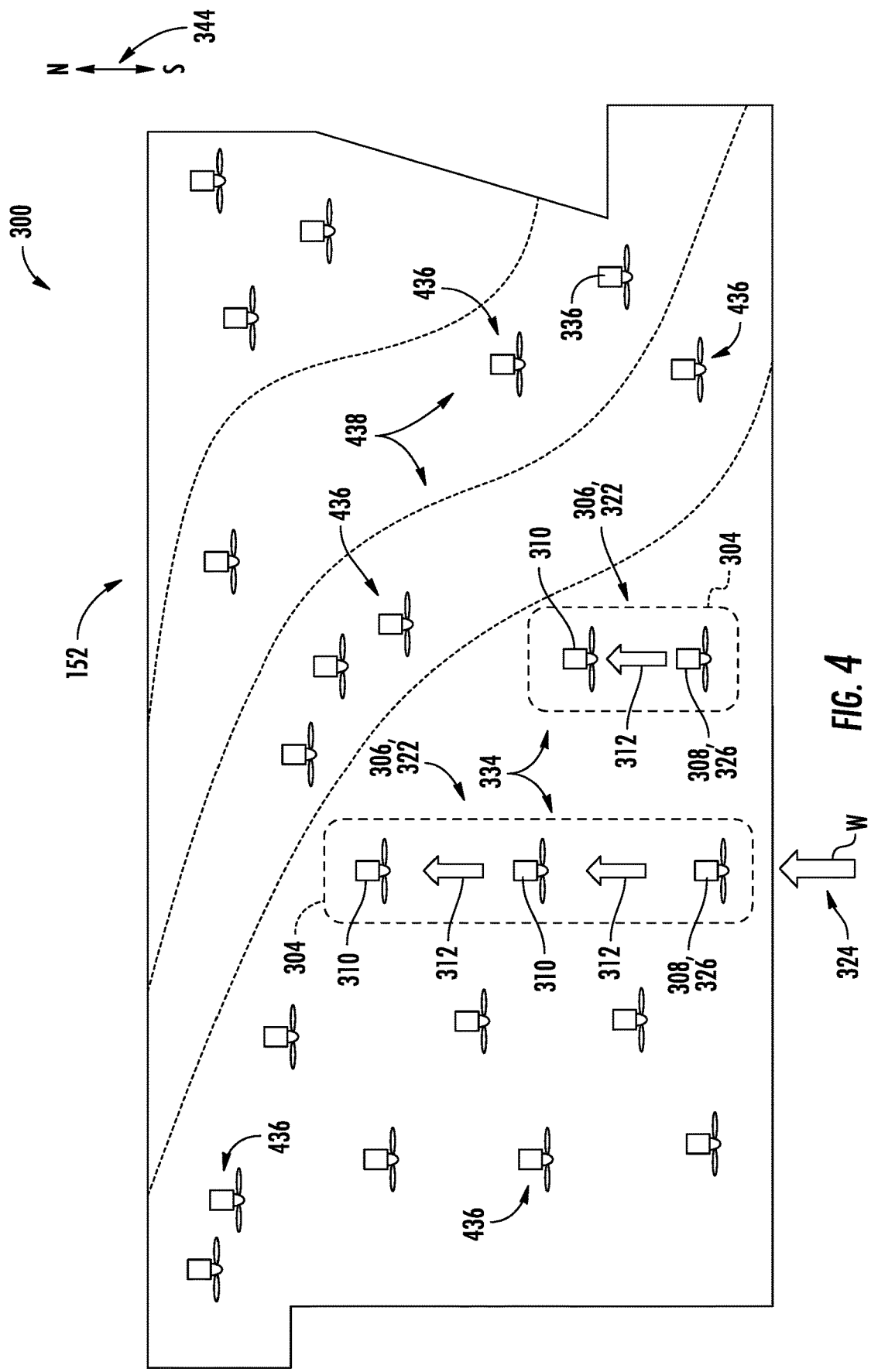
FIG. 4 illustrates an overhead view of a portion of the wind farm of FIG. 3 when the wind has a first wind direction according to the present disclosure.
Figure 5:
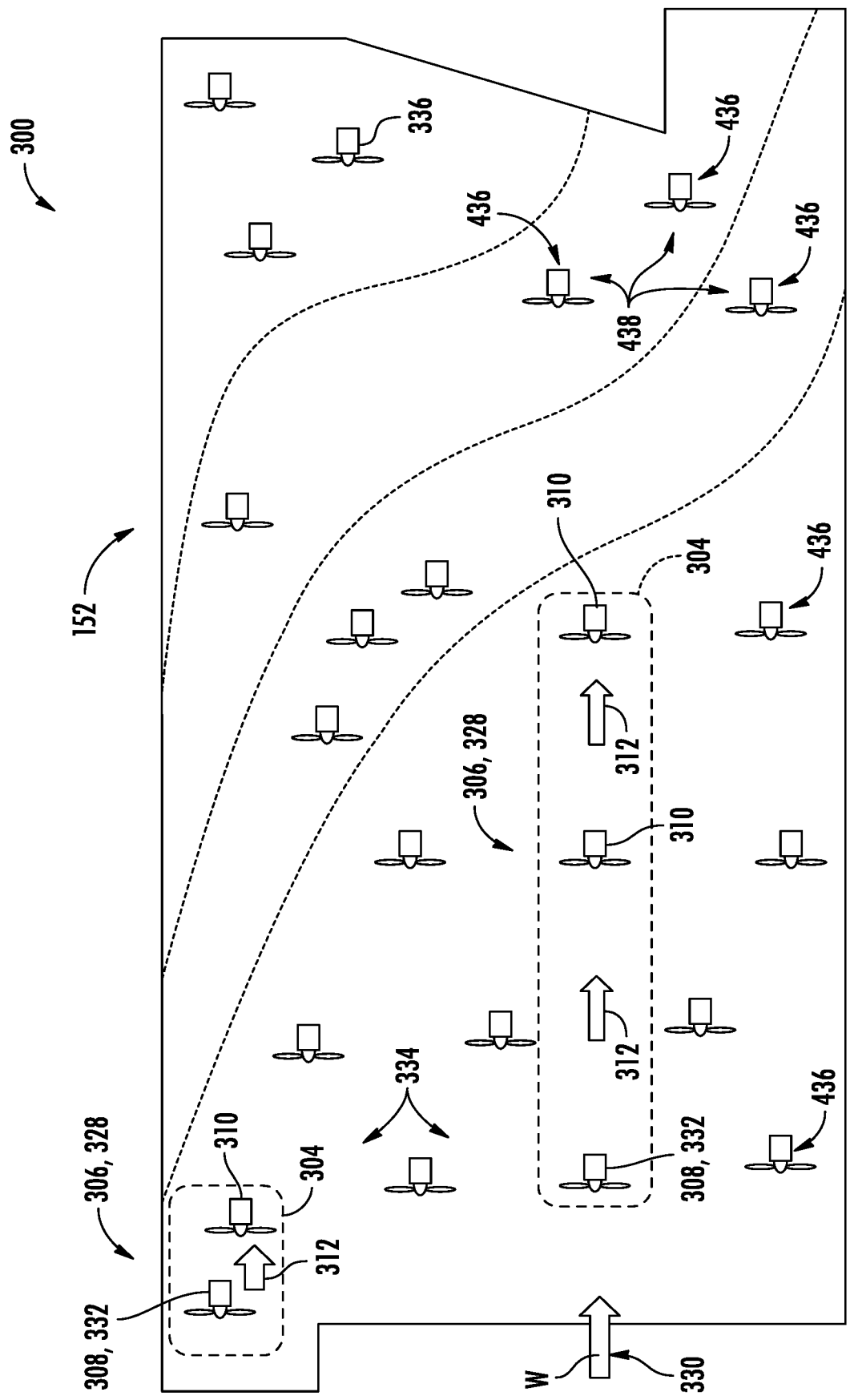
FIG. 5 illustrates an overhead view of a portion of the wind farm of FIG. 3 when the wind has a second wind direction according to the present disclosure.

Referring now to FIGS. 3, 4 and 5, a schematic view and top views of a wind farm 152 according to the present disclosure are illustrated. As shown, the wind farm 152 may include a plurality of the wind turbines 100 described herein and the controller 200 configured as a farm controller. For example, as shown in the illustrated embodiment of FIG. 3, the wind farm 152 may include twenty-two wind turbines 100. However, in other embodiments, the wind farm 152 may include any other number of wind turbines 100, such as less than twelve wind turbines 100 or greater than twelve wind turbines 100. In one embodiment, the controller(s) 200 may be communicatively coupled via a wired connection, such as by connecting the controller(s) through suitable communicative links 154 (e.g., a suitable cable). Alternatively, the controller(s) may be communicatively coupled through a wireless connection, such as by using any suitable wireless communications protocol known in the art.

In several embodiments, the wind farm 152 may include a plurality of environmental sensors 156 for monitoring a wind profile of the wind (W) affecting the wind farm 152, and thereby the wind turbines 100. The environmental sensor 156 may be configured for gathering data indicative of at least one environmental condition. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind velocity (e.g., wind direction and speed), wind shear, wind gust, wind veer, atmospheric pressure, pressure gradient and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions at each wind turbine 100 to be monitored individually by the respective turbine controllers and collectively by the farm controller. However, it should be appreciated that the utilization of the systems and methods disclosed herein may preclude a requirement for the environmental sensor(s) 156 to monitor certain environmental conditions, such as wind speed, in order to determine a performance parameter the wind turbine(s) 100.

In an embodiment, the wind turbine(s) 100 may include at least one operational sensor 158 configured to monitor an operation of the wind turbine(s) 100. As such, the operational sensor(s) 158 may be configured to monitor multiple parameters associated with the performance and/or health of at least a component of the wind turbine(s) 100. For example, the operational sensor(s) 158 may monitor parameters associated with vibrations, audible signals, visual indications, angular positions, rotational velocities, bending moments, power consumption, power generation, temperature and/or other suitable parameters. The operational sensor(s) 158 may, for example, be a rotational speed sensor operably coupled to the controller 200. For example, the operational sensor(s) 158 may be directed at the rotor shaft 122 of the wind turbine(s) 100, such as the wind turbine 114. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a direct current (DC) tachometer, an alternating current (AC) tachometer, a digital tachometer, a contact tachometer a non-contact tachometer, or a time and frequency tachometer.

The operational sensor(s) 158 may, for example, be configured to collect data indicative of a response of the component(s) of the wind turbine(s) 100 to the environmental condition(s) or other load. For example, the operational sensor(s) 158 may be configured to monitor electrical parameters of the output of the wind turbine(s) 100. As such, the operational sensor(s) 158 may be a current sensor, voltage sensor, temperature sensors, power sensor, and/or frequency meter that monitors the electrical output of the wind turbine(s) 100.

It should also be appreciated that, as used herein, the term "monitor" and variations thereof indicates that the various sensors of the wind turbine(s) 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine(s) 100.

Figure 6:
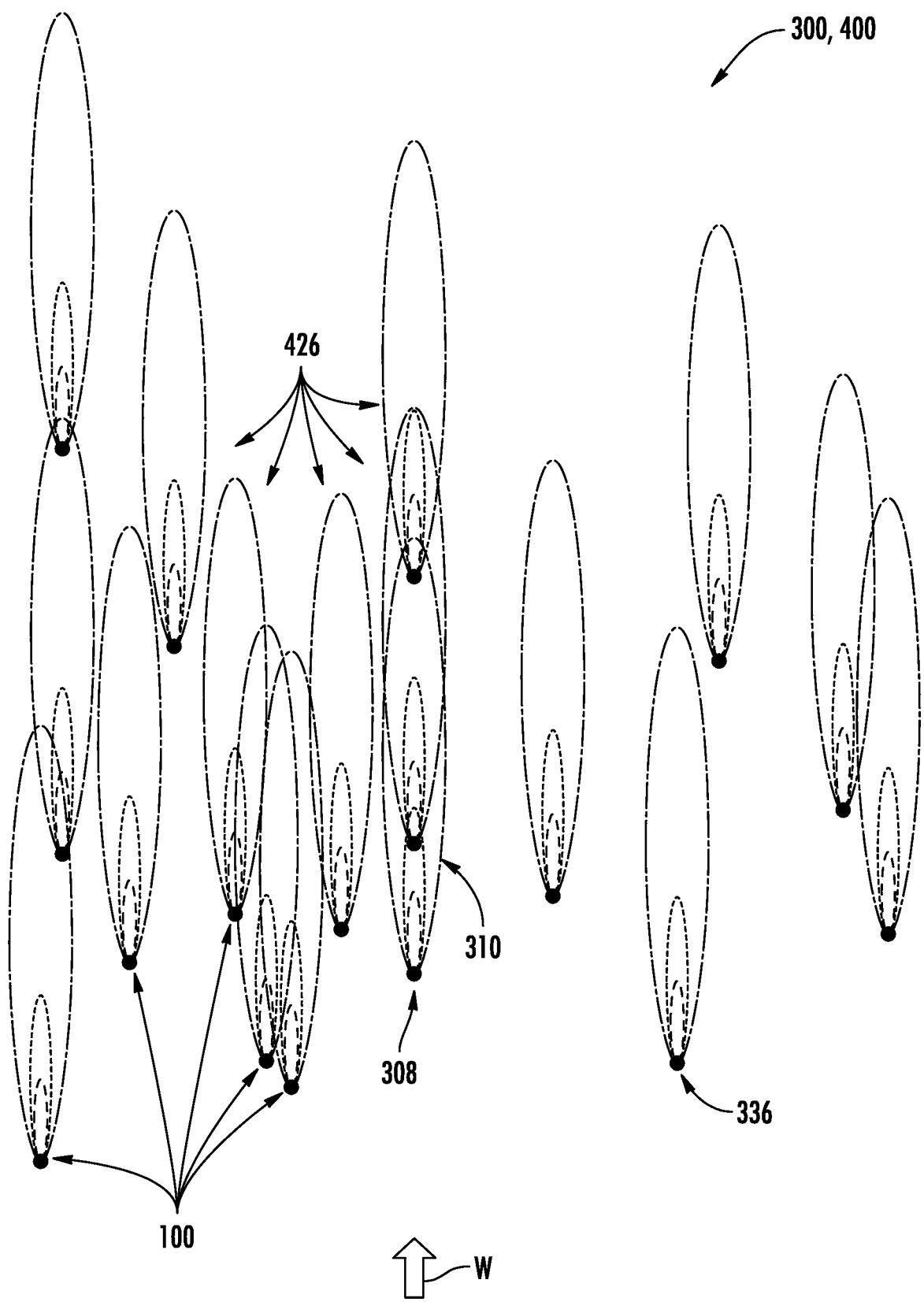
FIG. 6 illustrates a modeled overhead view of a portion of the wind farm of FIG. 3 depicting modeled wakes emanating from the wind turbines when the wind has the first wind direction according to the present disclosure.
Figure 7:
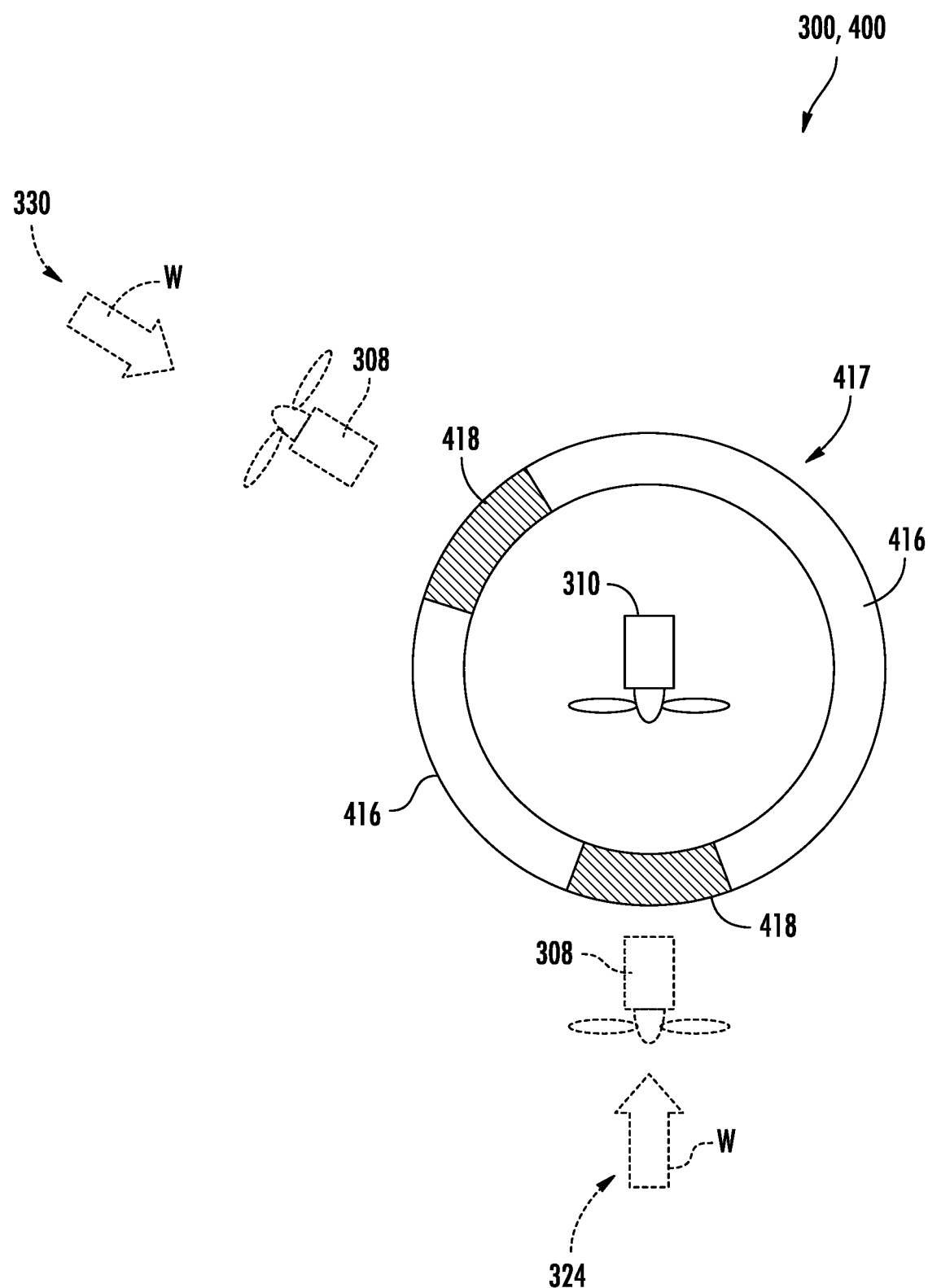
FIG. 7 illustrates an overhead view of a downwind turbine having freestream and wake sectors according to various wind directions.
Figure 8:
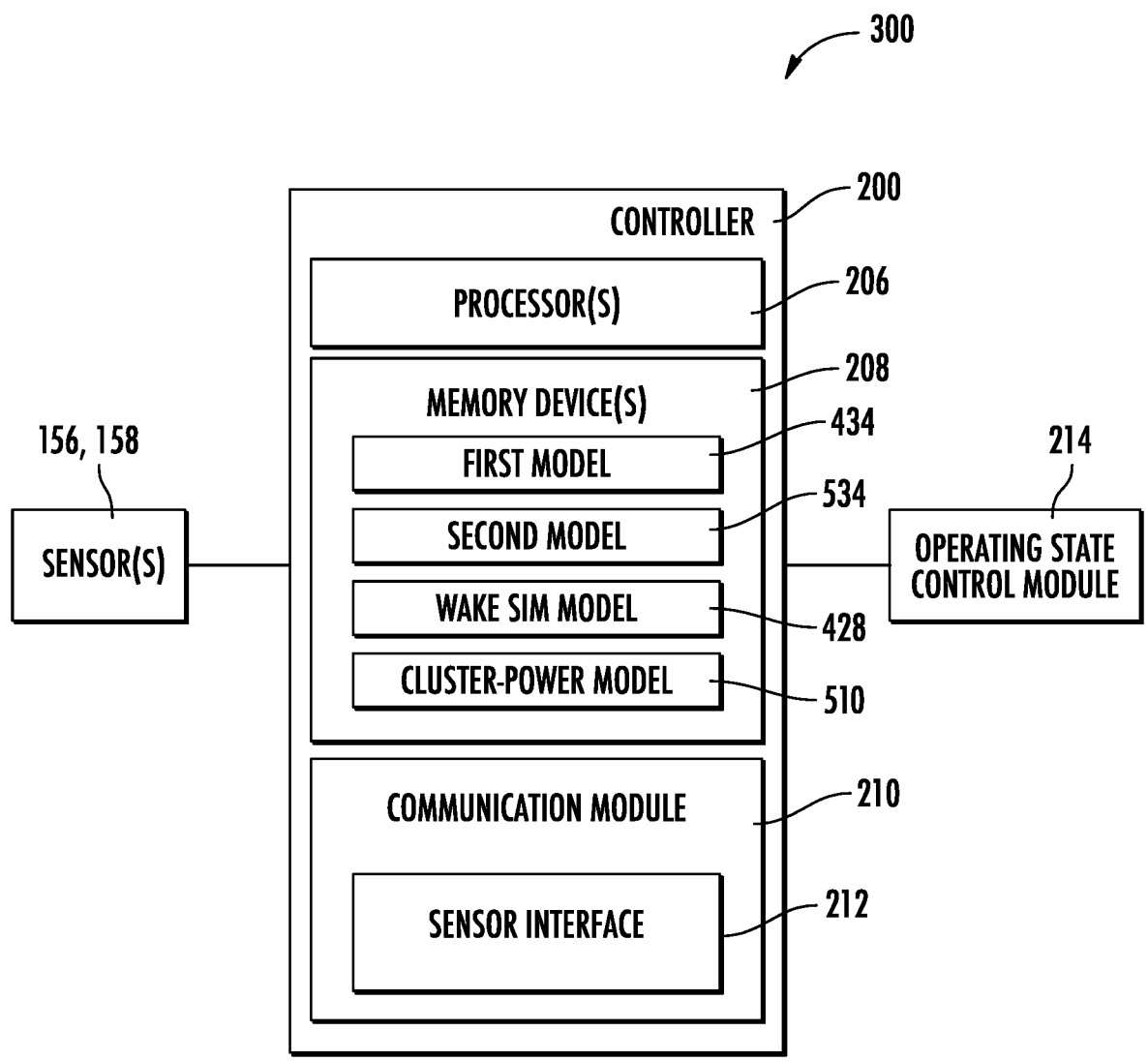
FIG. 8 illustrates a schematic diagram of one embodiment of a controller according to the present disclosure.

Referring now to FIGS. 4-12, wherein various aspects of multiple embodiments of a system 300 for controlling the wind farm 152 according to the present disclosure are presented. As shown particularly in FIG. 8, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof. Further, the communications module 210 may include a sensor interface 212 (e.g., one or more analog-to-digital converters) to permit signals transmitted from one or more sensors, such as the environmental sensor(s) 156 and/or the operational sensor(s) 158 to be converted into signals that can be understood and processed by the processors 206. It should be appreciated that the sensors may be communicatively coupled to the communications module 210 using any suitable means. For example, as shown in FIG. 8, the sensors may be coupled to the sensor interface 212 via a wired connection. However, in other embodiments, the sensors may be coupled to the sensor interface 212 via a wireless connection, such as by using any suitable wireless communications protocol known in the art. Additionally, the communications module 210 may also be operably coupled to an operating state control module 214 configured to change at least one wind turbine operating state of a wind turbine 100 of the wind farm 152. It should be appreciated that in an embodiment, the controller 200 may be communicatively coupled to additional controllers 200, such as a controller 200 configured to perform an off-line analysis of the environmental and operational parameters of the wind turbines 100 of the wind farm 152.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, controlling the wind turbine 100 of the plurality of wind turbines 100 of the wind farm 152 as described herein, as well as various other suitable computer-implemented functions.

Figure 9:
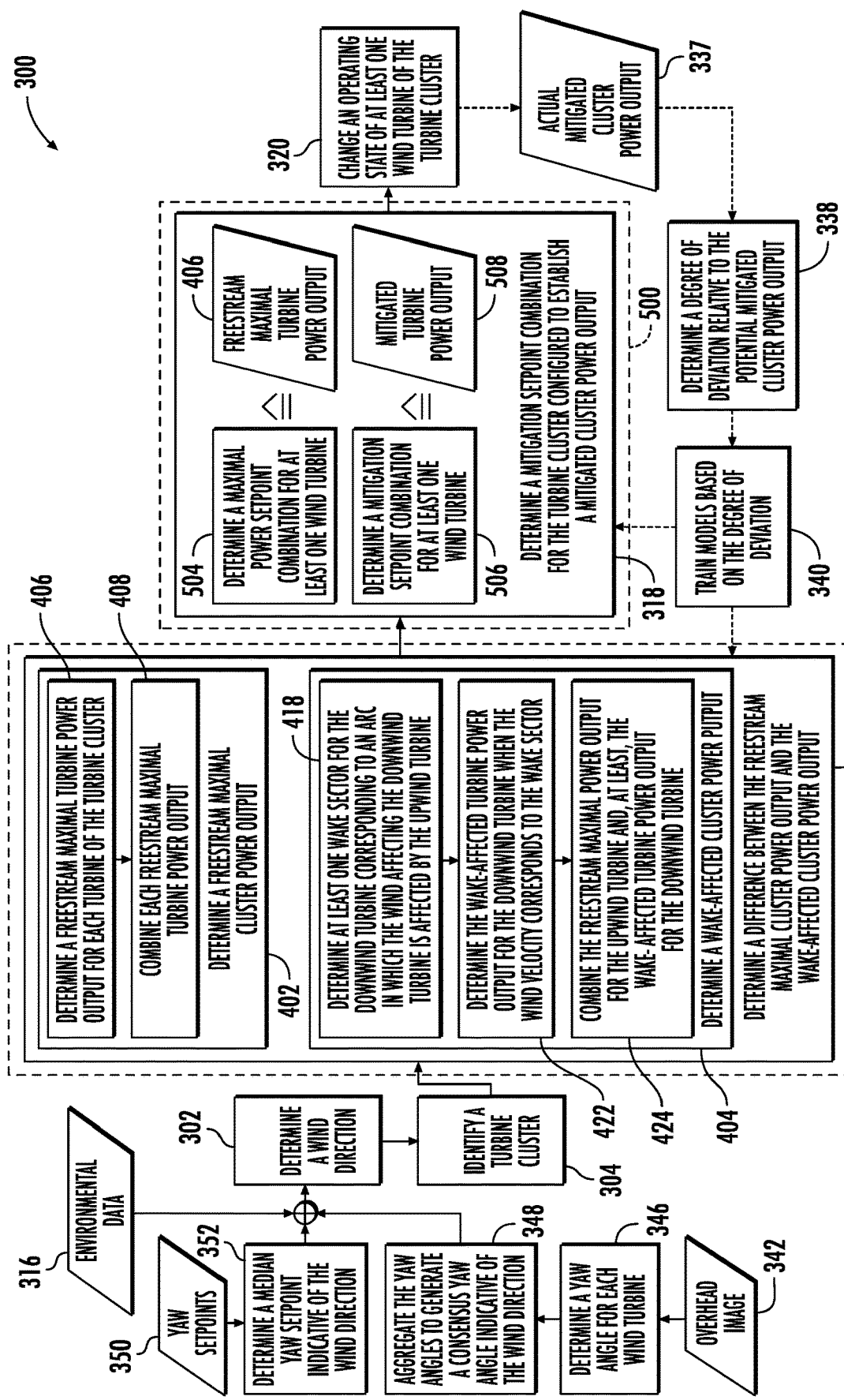
FIG. 9 illustrates a schematic diagram of one embodiment of a control logic of a system for operating a wind farm according to the present disclosure.

In an embodiment, the controller 200 of the system 300 may, as depicted at 302 of FIG. 9, determine a wind direction of the wind (W) affecting the wind farm 152 or a portion thereof When the wind (W) has the determined wind direction, the controller 200 may identify a turbine cluster 304. The turbine cluster 304 may include a subset 306 of the plurality of wind turbines 100 of the wind farm 152 when the wind (W) has the determined wind direction. The subset 306 of wind turbines 100 may include at least an upwind turbine 308 and a downwind turbine 310. The downwind turbine 310 may be affected by a wake 312 emanating from the upwind turbine 308. It should be appreciated that, as depicted in FIGS. 5 and 6, the wake 312 generated by one downwind turbine 310 of the turbine cluster 304 may affect an additional downwind turbine 310. It should be appreciated that, in certain embodiments, more than one turbine cluster 304 may be identified for the wind farm 152 and that each of the methods, steps, and/or procedures described herein may be accomplished for each identified wind turbine cluster 304.

Following the identification of the turbine cluster 304, the controller 200 may, in an embodiment, determine a difference 314 between a freestream maximal cluster power output 402 and a wake-affected cluster power output 404 of the turbine cluster 304 via process 400. The difference 314 may be based, at least in part, on a given wind speed affecting the wind farm 152. The given wind speed may, in an embodiment, be reflected by an environmental data set 316 received by the controller 200.

In an embodiment, the controller 200 may, as depicted by process 500, determine a mitigation setpoint combination 502 for the subset 306 of wind turbines 100. The mitigation setpoint combination 502 may be configured to establish a mitigated cluster power output 318 for the turbine cluster 304. The mitigated cluster power output 318 may be indicative of the combined power output of each wind turbine 100 of the subset 306 of wind turbines 100 when operated based on the mitigation setpoint combination 502. The mitigated cluster power output 318 may have a difference from the freestream maximal cluster power output 402 that is less than the difference between the freestream maximal cluster power output 402 and the wake-affected cluster power output 404 for the turbine cluster 304. In other words, the mitigated cluster power output 318 may reflect a total power output of the turbine cluster 304 which has a magnitude that is greater than the wake-affected cluster power output 404 and is less than the freestream maximal cluster power output 402. It should be appreciated that the development of the mitigated cluster power output 318 may be prioritized over the maximization of the power output of any one wind turbine 100 of the subset 306 of wind turbines 100 so as to optimize/maximize the power output of the wind farm 152.

Following the determination of the mitigation setpoint combination 502, an operating state 320 of at least one wind turbine 100 (e.g., the upwind turbine 308 and/or the downwind turbine(s) 310) may be changed in accordance with the mitigation setpoint combination 502. It should be appreciated that the mitigation setpoint combination 502 may include a combination of mitigation setpoints and nominal setpoints for the wind turbines 100 of the turbine cluster 304. The operating state 320 of the at least one wind turbine 100 affected by the mitigation setpoint combination 502 may include the pitch, tip speed ratio (TSR), yaw, generator torque, converter controls, and/or combinations thereof of the at least one wind turbine 100. It should be further appreciated that the mitigation setpoint combination 502 may deviate from a nominal, maximal setpoint for the wind turbine such that the maximal power production for the wind turbine 100 may be reduced in order to maximize the mitigated cluster power output 318 (e.g., the combined power output for each of the subset 306 of wind turbines 100).

As depicted particularly in FIG. 4, the turbine cluster 304 may, in an embodiment, have a first subset 322 of wind turbines 100 when the wind (W) has a first wind velocity 324. The first subset 322 may include a first upwind turbine 326. As such, when the wind (W) has the first wind velocity 324, the wind (W) impacting the first upwind turbine 326 may be unaffected by any intervening wind turbine 100 and/or other obstruction.

In an embodiment, the controller 200 may reform the turbine cluster 304 when the wind (W) has a velocity other than the first wind velocity 324. The reforming of the turbine cluster 304 may include an identification of at least a partially different grouping of wind turbines 100 relative to the first subset 322. As such, the turbine cluster 304 may, in an embodiment such as depicted in FIG. 5, have a second subset 328 of wind turbines 100 when the wind (W) has a second wind velocity 330. The second subset 328 may include a second upwind turbine 332. Accordingly, when the wind (W) has the second wind velocity 330, the wind (W) impacting the second upwind turbine 332 may be unaffected by any intervening wind turbine 100 and/or other obstruction. The first upwind turbine 326 and the second upwind turbine 332 may, as illustrated in FIGS. 4 and 5, correspond to different wind turbines 100 of the plurality of wind turbines 100 of the wind farm 152. It should be appreciated the differences between the first and second wind velocities 324, 330 may reflect different wind directions, different wind speeds, and/or combinations thereof. It should be further appreciated that the reforming of the turbine cluster may reflect differing impacts in the resultant waking effects based on the variations in the wind velocities.

While the first upwind turbine 326 and the second upwind turbine 332 may differ in accordance with the deviations in wind velocities, the at least one downwind turbine 310 may, in an embodiment, remain the same in both the first and second subsets 322, 328. As such, the wake 312 impacting a single downwind turbine 310 may emanate from differing upwind turbines 308 depending upon the wind velocity impacting the wind farm 152. However, in an additional embodiment, the first and second subsets 322, 328 may include different downwind turbines 310. For example, as depicted between FIGS. 5 and 6, the turbine cluster 304 may be located in a first portion of the wind farm 152 when the wind (W) has the first wind velocity 324 and may be located in a second portion of the wind farm 152 when the wind (W) has the second wind velocity 330.

Referring still, in particular to FIGS. 4 and 5, in an embodiment, the turbine cluster 304 may be one of a plurality of turbine clusters 334 for the wind farm 152 for the determined wind direction. For example, in an embodiment, the controller 200 may identify a different turbine cluster 304 for each wind turbine 100 that is affected by a wake 312 emanating from an upwind turbine 308. For example, in an embodiment, the plurality of wind turbines 100 of the wind farm 152 may be divided into a plurality of turbine clusters 334 and a plurality of independent turbines 336 for a given wind direction. The independent turbines 336 may be wind turbines 100 of the wind farm 152 whose performance is neither impacted by an upwind turbine 308 nor impacts a downwind turbine 310. In such an embodiment, the control of the wind farm 152 may be based on a combination of the performance of the plurality of turbine clusters 334 and the independent turbines 336 for a given wind velocity.

In order to determine the difference between the freestream maximal cluster power output 402 and the wake-affected cluster power output 404, the controller 200 of the system 300 may, in an embodiment, determine a freestream maximal turbine power output 406 for each wind turbine 100 of the turbine cluster 304 for the given wind speed affecting the wind farm. The freestream maximal turbine power output 406 for each wind turbine 100 may correspond to a maximum power setpoint combination for each wind turbine 100 for the given wind speeds. As such, the freestream maximal turbine power output 406 may correspond to the nominal power output of the wind turbine 100 for the given environmental and/or electrical grid conditions. In other words, the freestream maximal turbine power output 406 may be the maximum power producible by the wind turbine 100 (based on design and/or operational limits) should the wind (W) impacting the wind farm 152 impact the wind turbine 100 without being obstructed by an upwind turbine 308 and/or other obstruction. The freestream maximal turbine power output 406 may represent a power output of the downwind turbine 310 when not impacted by the wake 312.

As depicted at 408, the controller 200 may, in an embodiment, combine the freestream maximal turbine power output 406 for each wind turbine 100 of the turbine cluster 304. The combination of the freestream maximal turbine power output 406 for each wind turbine may yield the freestream maximal cluster power output 402. In other words, the freestream maximal cluster power output 402 may correspond to the maximal nominal power output of the entire turbine cluster 304 if the wind (W) at each wind turbine 100 were unobstructed. Thus, the combination of the freestream maximal turbine power outputs 406 may yield the maximum power producible by the turbine cluster 304 (based on design and/or operational limits) for a given wind speed regardless of wind direction.

Figure 10:
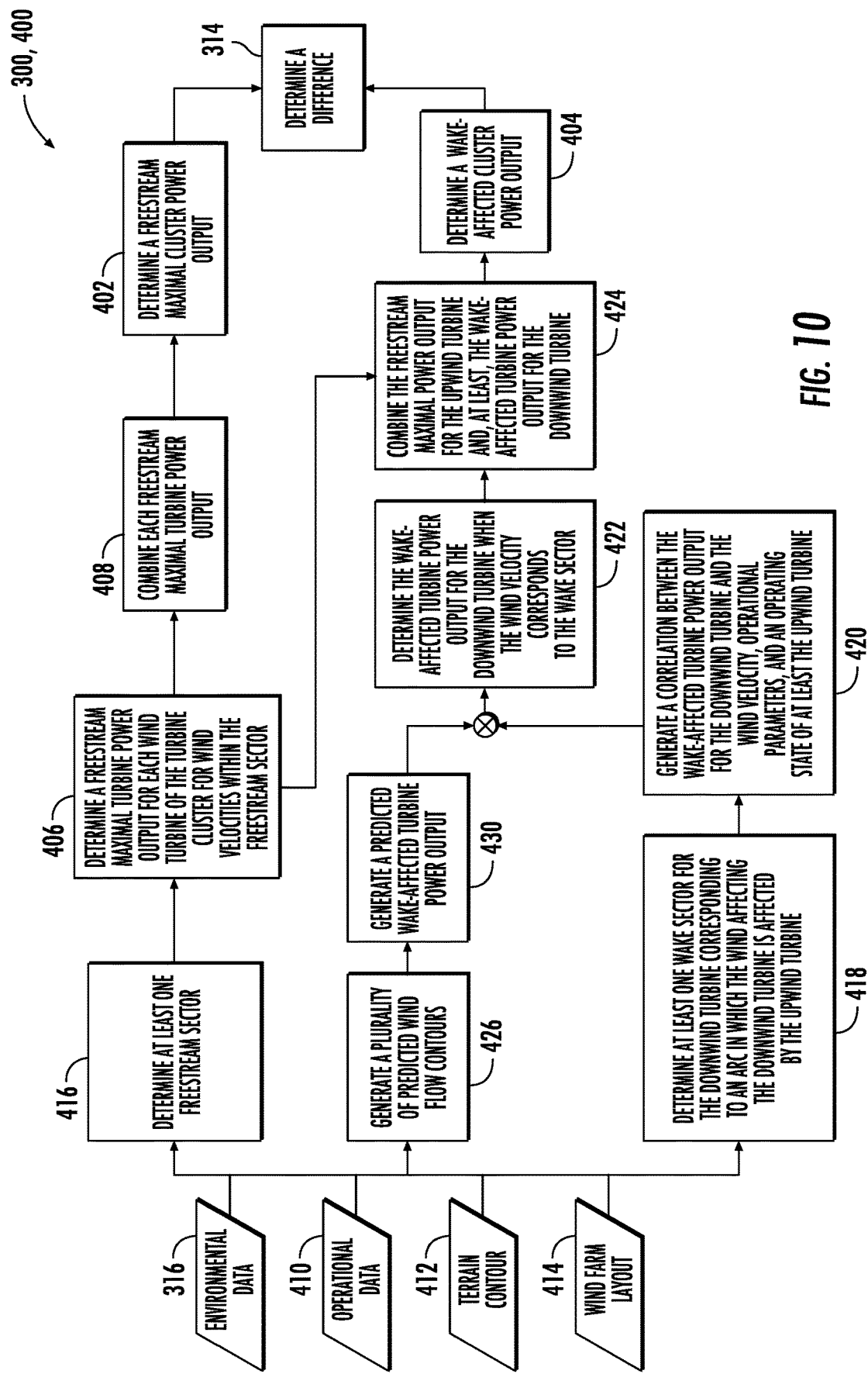
FIG. 10 illustrates a schematic diagram of a portion of the control logic of FIG. 9 according to the present disclosure.

As depicted particularly in FIG. 10, to determine the freestream maximal turbine power output 406 for each wind turbine 100 of the turbine cluster 304, the controller 200 may, in an embodiment, receive an operational data set 410. The operational data set 410 may be indicative of a plurality of historical operating parameters of the subset 306 of wind turbines 100. The plurality of historical operating parameters may, at least, be indicative of a historical power output and yaw orientation of each wind turbine 100 in response to a then prevailing environmental condition. As such, the operational data set 410 may include historical indications of at least a pitch setpoint, a tip speed ratio, and a yaw position for the subset 306 of the wind turbines 100 at a plurality of sampling intervals.

In addition to the operational data set 410, the controller 200 may, in an embodiment, also receive the environmental data set 316. The environmental data set 316 may be indicative of a plurality of environmental conditions affecting the subset 306 of wind turbines 100 and/or the wind farm 152 in general. The environmental data set 316 may include historical environmental data corresponding to the plurality of historical operating parameters at the plurality of sampling intervals. Additionally, the environmental data set may include environmental data corresponding to current environmental conditions impacting wind farm 152.

In an embodiment, the system 300 may also receive terrain contour data 412 and/or a wind farm layout 414. The terrain contour data 412 may be descriptive of the terrain of the wind farm 152. The wind farm layout 414 may be indicative of a positioning of the plurality of wind turbines 100 of the wind farm 152 relative to the terrain of the wind farm 152 as indicated by the during contour data 412. Accordingly, in an embodiment, at least one freestream sector 416 may be determined via an analysis of the wind farm layout 414 and the terrain contour 412. The freestream sector(s) 416 may, as depicted in FIG. 7, correspond to an arc in the horizontal plane (e.g., a yaw arc 417) in which the wind (W), having a particular wind velocity, affecting each wind turbine 100 is unobstructed, at least, by an intervening wind turbine 100 (e.g., the upwind turbine 308).

Following the identification of the freestream sector(s) 416, in an embodiment, the controller 200 may determine the freestream maximal turbine power output 406 for each wind turbine 100 of the subset 306 of wind turbines 100. The determination of the freestream maximal turbine power output 406 may be based, at least in part, on the operational data set 410 and the environmental data set 316 for wind velocities within the freestream sector(s) 416. For example, the controller 200 may correlate the historical power output of each wind turbine 100 to yaw positions/setpoints corresponding to the freestream sector(s) 416.

In addition to identifying the freestream sector(s) 416, in an embodiment, at least one wake sector 418 may be determined for the downwind turbine 310. In an embodiment, the wake sector(s) 418 may be determined via an analysis of the wind farm layout 414 and the terrain contour 412. The wake sector(s) 418 may, as depicted in FIG. 7, correspond to an arc in the horizontal plane (e.g., a yaw arc 417) in which the wind (W), of the particular wind velocity, affecting the downwind turbine 310 is affected by the upwind turbine 308.

For example, in an embodiment, the analysis of the wind farm layout 414 may include the generation of a plurality of predicted wind flow contours 426, such as depicted in FIG. 6. The plurality of predicted wind flow contours 426 may be generated via a wake simulation model 428 programmed in the controller 200. The plurality of predicted wind flow contours 426 may, in an embodiment, the generated for each wind turbine 100 of the plurality of wind turbines 100 of the wind farm 152 for a plurality of wind velocities. The wake simulation model 428 may also be utilized to generate a predicted wake-affected turbine power output 430 for the downwind turbine 310 based, at least in part, on the plurality of predicted wind flow contours 426. It should be appreciated that the wake simulation model 428 may, in an embodiment, be a physics-based wake model, such as FLORIS Wake Modeling Utility from the National Renewable Energy Laboratory.

In an embodiment, the controller 200 may identify a correlation 420 between a wake-affected turbine power output 422 for the downwind turbine 310, the wind velocity, an operational parameter of the downwind turbine 310, and an operating state of, at least, the upwind turbine 308. In an embodiment, the operational parameter of the downwind turbine 310 may include a pitch setpoint, a tip speed ratio, and a yaw position of the downwind turbine 310. It should be appreciated that the correlation 420 may be derived from the historical operating parameters. It should further be appreciated that the correlation 420 may, in an embodiment, be determined via a model implemented by the controller 200.

The controller 200 may, in an embodiment, determine the wake-affected turbine power output 422 for the downwind turbine 310 when the wind velocity of a current wind (W) corresponds to the wake sector(s) 418. This determination may be based, at least in part, on the identified correlation 420. The wake-affected turbine power output 422 may be indicative of the impact on the power output (e.g., a power output reduction) of the downwind turbine 310 of the wake 312 when the wind (W) corresponds to the wake sector(s) 418. For example, the controller 200 may determine that for a given wind velocity (e.g., wind speed and wind direction), when the upwind turbine 308 is operating at a nominal setpoint, operating the downwind turbine 310 at a nominal setpoint will result in a reduction in the power output of the downwind turbine 310 of a certain percentage relative to the freestream maximal turbine power output 406.

As depicted at 424, in an embodiment, the controller 200 may combine the freestream maximal turbine power output 406 for the upwind turbine 308 with, at least, the wake-affected turbine power output 422 of the downwind turbine 310. Such a combination may determine the wake-affected cluster power output 404 for the turbine cluster 304. In other words, the combination of the freestream maximal turbine power output 406 of the upwind turbine 308 with, at least, the wake-affected turbine power output 422 of the downwind turbine 310 may indicate a reduction in the power output of the turbine cluster 304 relative to the freestream maximal cluster power output 402 that may be attributable to the wake 312 impacting the downwind turbine 310.

Figure 11:
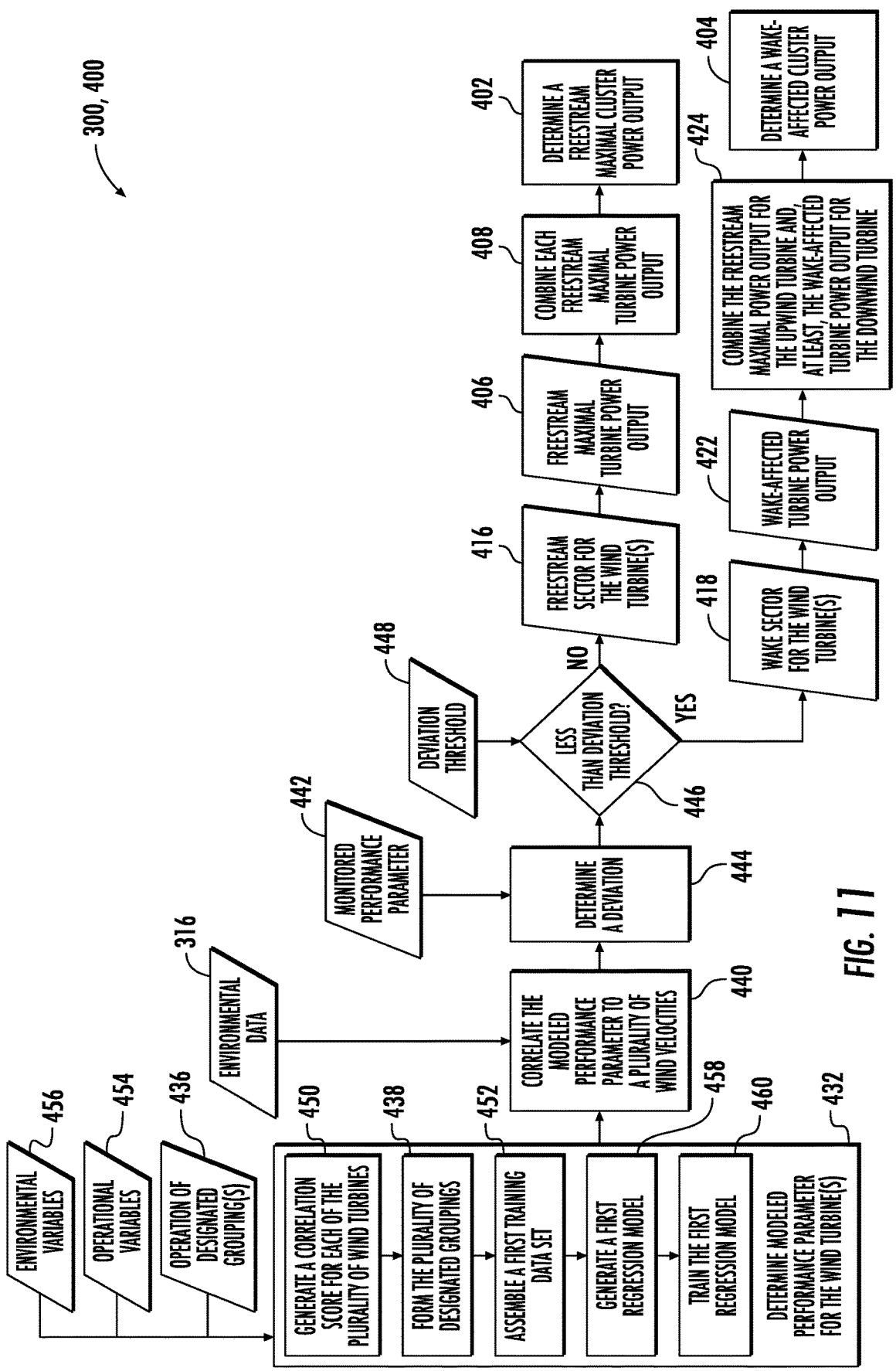
FIG. 11 illustrates a schematic diagram of a portion of the control logic of FIG. 9 according to the present disclosure.

In order to determine the difference between the freestream maximal cluster power output 402 and the wake-affected cluster power output 404, the controller 200 of the system 300 may, in an embodiment such as depicted in FIG. 11, determine a modeled performance parameter 432 for each wind turbine 100 of the subset 306 of wind turbines 100. The modeled performance parameter may be determined via a first model 434 implemented by the controller 200.

In an embodiment, the modeled performance parameter 432 may be based, at least in part, on an operation of a designated grouping 436 of a plurality of designated groupings 438 of wind turbines 100 of the plurality of wind turbines 100. Each designated groupings 436 of the plurality of designated groupings 438 may correspond to one wind turbine 100 of the subset 306 of wind turbines 100. Each designated grouping 436 may be exclusive of the subset 306 of wind turbines 100. In other words, each designated grouping 436 may include only wind turbines 100 which are not included in the turbine cluster 304 for a given wind velocity.

As depicted at 440, the controller 200 may, in an embodiment, correlate the modeled performance parameter 432 for each wind turbine 100 to a plurality of wind velocities. For example, the controller 200 may determine a power output for each wind turbine 100 of the turbine cluster 304 for a corresponding wind velocity (e.g., wind speed and wind direction).

In an embodiment, the controller 200 may determine whether a monitored performance parameter 442 has a deviation 444 relative to the modeled performance parameter 432. As depicted at 446, the controller 200 may then determine a relationship of the deviation 444 to a deviation threshold 448. In an embodiment wherein the deviation 444 from the modeled performance parameter 432 is less than the deviation threshold 448, the deviation 444, and the corresponding monitored performance parameter 442, may be indicative of a turbine power output corresponding to the freestream maximal turbine power output 406 for each wind turbine 100 of the turbine cluster 304. As such, the controller 200 may determine the freestream sector(s) 416 for each wind turbine 100 of the subset 306 of wind turbines 100 wherein the monitored performance parameter 442 for each wind turbine 100 of the subset 306 of wind turbines 100 has a deviation 444 from the modeled performance parameter 432 which is less than the deviation threshold 448. It should be appreciated that the freestream sector(s) 416 corresponds to an arc in which the power output of each wind turbine 100 indicates that the wind (W) affecting each wind turbine 100 is unobstructed, at least, by an intervening wind turbine 100.

In addition to determining sectors wherein the deviation 444 is less than the deviation threshold 448, the controller 200 may, determine the wake sector(s) 418 for the downwind turbine 310. The wake sector(s) 418 may correspond to an arc in which the wind (W) affecting the downwind turbine 310 is affected by the upwind turbine 308. In such an embodiment, the monitored performance parameter 442 of the downwind turbine 310 may have a deviation 444 from the modeled performance parameter 432 that exceeds the deviation threshold 448. It should be appreciated that a deviation 444 of the monitored performance parameter 442 from the modeled performance parameter 432 that is greater than the deviation threshold 448 may be indicative of a turbine power output corresponding to a wake-affected turbine power output 422 for the downwind turbine 310.

For example, in an embodiment the modeled performance parameter 432 may be a predicted power output based on the wind speed affecting the downwind turbine 310. Similarly, the monitored performance parameter 442 may be an actual power output of the downwind turbine 310 as monitored by the controller 200. As such, in an embodiment wherein the actual power output of the downwind turbine 310 falls below an acceptable degree of deviation from the predicted power output for a particular yaw orientation and in response to a particular wind velocity, the wake sector(s) 418 may be indicated. Accordingly, when the downwind turbine 310 is oriented in the wake sector(s) 418, the actual power output may be the wake-affected turbine power output 422 for the downwind turbine 310.

Referring still in particular to FIG. 11, in an embodiment, the controller 200 may determine the freestream maximal cluster power output 402 by combining the freestream maximal turbine power output 408 for each wind turbine 100 of the turbine cluster 304 as indicated by the deviation 444 that is less than the deviation threshold 448. Additionally, the controller 200 may determine the wake-affected cluster power output 404 by combining the freestream maximal turbine power output 408 for the upwind turbine 308 with, at least, the wake-affected turbine power output 422 of the downwind turbine 310 when the deviation 444 exceeds the deviation threshold 448.

In so far as the modeled performance parameter 432 may be based on the operation of each designated grouping 436, it may be desirable that the performance of the particular wind turbines 100 of the wind farm 152 selected to form each designated grouping 436 correlate to the performance of the respective wind turbine 100 of the subset 306 of wind turbines 100. As such, in order to select wind turbines 100 each designated grouping 436 from the plurality of wind turbines 100 of the wind farm 152, it may be desirable to rank all of the wind turbines 100 of the wind farm 152 according to their correlation to the respective wind turbine 100 of the turbine cluster 304. As such, in an embodiment, the controller 200 may generate a correlation score 450 relative to each wind turbine 100 of the subset 306 of wind turbines 100 of each of the plurality of wind turbines 100 of the wind farm 152.

In an embodiment, the formation of plurality of designated groupings 438 of the wind turbines 100 may be based, at least in part, on the correlation score 450 for each wind turbine 100. For example, the controller 200 may designate particular wind turbines 100 of the wind farm 152 as key reference turbines based on the strength of the correlation between their performance and the performance of a respective wind turbine 100 of the turbine cluster 304, as indicated by the correlation score 450. It should be appreciated that this designation may, as depicted in FIGS. 4 and 5, be made regardless of the physical location of the wind turbines 100 within the wind farm 152.

Referring still to FIG. 11, in an embodiment, determining the modeled performance parameter 432 may include assembling a first training data set 452. The first training data set 452 may include a plurality of operational variables 454 and environmental variables 456 corresponding at least to the plurality of designated groupings 438 of wind turbines 100. The operational and environmental variables 454, 456 may be monitored at the plurality of sampling intervals and across a plurality of DOE states wherein a plurality of setpoint combinations may be toggled. It should be appreciated that the operational variables 454 may, in an embodiment, be obtained via the operational sensor(s) 158 of the wind turbines 100.

In an embodiment, the controller 200 may generate a first regression model 458 to form the first model 434. The first regression model 458 may be configured to predict the modeled performance parameter 432 for each wind turbine 100 of the subset 306 of wind turbines 100 based on the operational and environmental variables 454, 456 corresponding to the plurality of designated groupings 438 of wind turbines 100. For example, the controller 200 may generate a regression model whereby the operational and environmental variables 454, 456 of each designated grouping 436 that may be employed to predict the modeled performance parameter 432 for each wind turbine 100 of the turbine cluster 304.

As depicted at 460, in an embodiment, the controller 200 may be configured to train the first regression model 458. The training of the first regression model 458 may be based on the first training data set 452. Accordingly, machine learning techniques may be employed to iteratively refine the first regression model 458.

It should be appreciated that the data points/variables which may be desirable for the training of the first model 434 may be obtained during the DOE and/or the operational employment of the wind farm 152. For example, the variables may include indications of average power generation, nacelle-anemometer measured average wind speed, model-based average wind speed, model-based wind speed standard deviation, yaw position, DOE states, average ambient temperature, generator speed, generator shaft acceleration, generator torque, generator power, filtering variables, and/or wind turbine identifiers.

Further aspects of determining the modeled performance parameter via the first model 434 are described in U.S. patent application Ser. No. 17/340,387. As such, U.S. patent application Ser. No. 17/340,387 entitled "Systems and Methods for Controlling a Wind Turbine" filed Jun. 7, 2021 is incorporated herein by reference in its entirety for all purposes.

Figure 12:
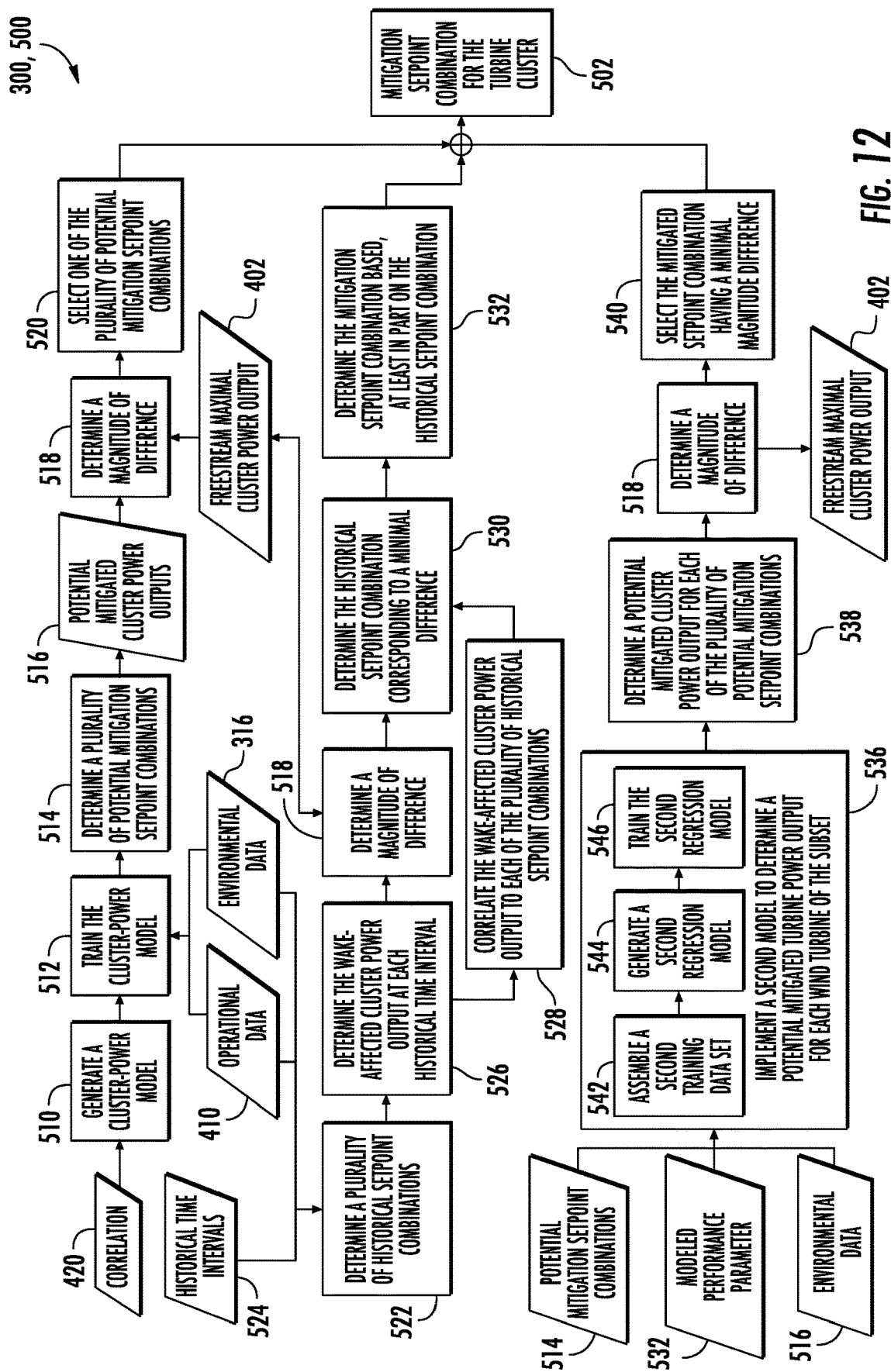
FIG. 12 illustrates a schematic diagram of a portion of the control logic of FIG. 9 according to the present disclosure.

Referring now in particular to FIGS. 9 and 12, in order to determine the mitigation setpoint combination 502 for the subset 306 of wind turbines 100 the maximal power setpoint combination 504 for at least one wind turbine 100 of the turbine cluster 304 may be determined. The maximal power setpoint combination 504 may correspond to the freestream maximal turbine power output 406 of the at least one wind turbine 100.

As depicted at 506, the controller 200 may also determine a mitigation setpoint combination 502 for at least one wind turbine 100 of the turbine cluster 304. The mitigation setpoint combination 502 may be different than the maximal power setpoint combination 504 for the at least one wind turbine 100. The mitigation setpoint combination 502 for each wind turbine 100 of the turbine cluster 304 may correspond to (e.g., result in the development of) a mitigated turbine power output 508. The mitigated turbine power output 508 may correspond to the mitigated cluster power output 318. The mitigated turbine power output 508 may be less than the freestream maximal turbine power output 406 for the at least one wind turbine 100 of the turbine cluster 304. However, the corresponding mitigated cluster power output 318 may be greater than the wake-affected cluster power output 404.

In an embodiment, determining the mitigation setpoint combination 502 for the subset 306 of wind turbines 100 may include generating, via the controller 200, a cluster-power model 510. The cluster-power model 510 may be based, at least in part, on the correlation 420 between the wake-affected turbine power output 422 for the downwind turbine 310 and the wind velocity, an operational parameter of the downwind turbine 310, and an operating state of, at least, the upwind turbine 308. As depicted at 512, in an embodiment, the cluster-power model 510 may be trained via the operational data set 410 and the environmental data set 316. For example, the cluster-power model 510 may be trained to predict a wake-affected turbine power output 422 in response to a combination of the wind velocity, an operational parameter of the downwind turbine 310, and an operating state of the upwind turbine 308. As such the cluster-power model 510 may facilitate the selection of a mitigation setpoint combination 502 resulting in a desired mitigated cluster power output 318 for the turbine cluster 304.

Following the generation and training of the cluster-power model 510, the controller 200 may, in an embodiment, determine a plurality of potential mitigation setpoint combinations 514 for the subset 306 of wind turbines 100. The plurality of potential mitigation setpoint combinations 514 may be determined for the plurality of environmental conditions corresponding to the wake sector(s) 418. The plurality of potential mitigation setpoint combinations 514 may be based on the cluster-power model 510. The plurality of potential mitigation setpoint combinations 514 may be indicative of various potential operating states of the wind turbines 100 of the turbine cluster 304 that may be employed to mitigate the impact of the wake 312 on the power output of the turbine cluster 304. As such, each of the plurality of potential mitigation setpoint combinations 514 may correspond to a potential mitigated cluster power output 516.

In an embodiment, the cluster-power model 510 may determine a magnitude of the difference 518 between the each of the potential mitigated cluster power outputs 516 and the freestream maximal cluster power output 402. As depicted at 520, the cluster-power model 510 may select one of the plurality of potential mitigation setpoint combinations 514 that corresponds to the potential mitigated cluster power output 516 having a magnitude of the difference 518 that is less than the magnitude of difference 518 for each remaining potential mitigated cluster power output 516. For example, the cluster-power model 510 may be configured to iteratively test the various potential mitigation setpoint combinations 514 to determine the specific setpoint combination which yields the greatest mitigated cluster power output 318.

In an additional embodiment, determining the mitigation setpoint combination 502 for the turbine cluster 304 may leverage naturally occurring DOE states inherent in the operation of the wind from 152 to identify such setpoint combinations as have historically yielded a desirable power output for the turbine cluster 304. As such, the controller 200 may, in an embodiment, determine a plurality of historical setpoint combinations 522. The plurality of historical setpoint combinations 522 may be indicated by the operational data set 410 for each wind turbine 100 of the subset 306 of wind turbines 100 for the particular wind velocity(ies) corresponding to the wake sector(s) 418. The plurality of historical setpoint combinations 522 may correspond to a plurality of historical time intervals 524. The plurality of historical setpoint combinations 522 may be indicative of a plurality of variations in recorded setpoint combinations for each wind turbine 100 of the subset 306 of wind turbines 100 for the particular wind velocity.

As depicted at 526, in an embodiment, the controller 200 may determine the wake-affected cluster power output 404 at each of the plurality of historical time intervals 524. Additionally, the controller 200 may, as depicted at 528, correlate the wake-affected cluster power output 404 at each of the plurality of historical time intervals 524 to each of the plurality of historical setpoint combinations 522.

In an embodiment, the controller 200 may determine a magnitude of difference 518 between each wake-affected cluster power output 404 and the freestream maximal cluster power output 402. As depicted at 530, the controller 200 may select one of the plurality of historical setpoint combinations 522 that corresponds to the recorded wake-affected cluster power output 404 having a magnitude of the difference 518 that is less than the magnitude of difference 518 for each remaining recorded wake-affected cluster power output 404 at each of the remaining plurality of historical time intervals 524. As depicted at 532, the controller 200 may determine the mitigation setpoint combination 502 based, at least in part, on the determined historical setpoint combination 522 corresponding to the minimal difference.

Determining the mitigation setpoint combination 502 for the turbine cluster 304 may, in an embodiment, implement a second model 534. The second model 534 may facilitate the determination of a potential mitigated turbine power output 536 for each wind turbine 100 of the subset 306 of wind turbines 100 at each of a plurality of potential mitigation setpoint combinations 514. The potential mitigated turbine power output 536 may be based, at least in part, on the modeled performance parameter 432 from the first model 434 for each wind turbine 100 of the subset 306 of wind turbines 100 for the wind velocity.

As depicted at 538, the controller 200 may, in an embodiment, determine a potential mitigated cluster power output 516 for each of the plurality of potential mitigation setpoint combinations 514. For example, the second model 534 may be configured to determine the total power output of the turbine cluster 304 when each wind turbine of the turbine cluster 304 is operated in accordance with each of the plurality of potential mitigation setpoint combination 514. It should be appreciated that the potential mitigated cluster power output 516 may correspond to the sum of the potential mitigated turbine power output 536 of each turbine 100 of the turbine cluster 3044 each potential mitigation setpoint combination 514.

In an embodiment, the controller 200 may determine a magnitude of difference 518 between each potential mitigated cluster power output 516 and the freestream maximal cluster power output 402. As depicted at 540, the controller 200 may select one of the of potential mitigated setpoint combinations 514 that corresponds to the mitigated cluster power output 516 having a magnitude of the difference 518 that is less than the magnitude of difference 518 for each remaining mitigated cluster power output 516 at each of the remaining plurality of potential mitigated setpoint combinations 514.

Referring still in particular to FIG. 12, in an embodiment, implementing the second model 534 may include assembling a second training data set 542. The second training data set 542 may include the plurality of operational variables 454 and the plurality of environmental variables 456. The plurality of operational and environmental variables 454, 456 may correspond, at least, to each respective wind turbine 100 of the subset 306 of wind turbines 100 and to the plurality of designated groupings 438 of wind turbines 100. The operational and environmental variables 454, 456 may, in an embodiment, be monitored at the plurality of sampling intervals and DOE states wherein a plurality of setpoint combinations are toggled. It should be appreciated that the second training data set 542 may be tailored/optimized to include predictors which best capture the environmental conditions affecting each wind turbine 100 of the turbine cluster 304.

In an embodiment, the controller 200 may generate a second regression model 544. The second regression model 544 may, in an embodiment, be configured to determine the potential mitigated turbine power output 536 for each wind turbine 100 of the turbine cluster 304. This determination may be based on the operational and environmental variables 454, 456 and the model performance parameter 432. For example, the controller 200 may generate a support-vector-machine regression model whereby the modeled performance parameter 432 and the operational and environmental variables 454, 456 for each wind turbine 100 of the turbine cluster 304 may be employed to model the potential mitigated turbine power output 536 generated in response to each of the potential mitigation setpoint combinations 514.

As depicted at 546, the controller 200 may be configured to train the second regression model 544 based on the second training data set 542. Accordingly, machine learning techniques may be employed to iteratively refine the second regression model 544. It should be appreciated that refining the second regression model 544 may facilitate an increased accuracy in the predicted mitigated cluster power output 318 based on the model performance parameter 432 at each of the potential mitigation setpoint combinations 514. It should further be appreciated that, in an embodiment, training the second regression model 544 may include testing of the second regression model 544 via a plurality of training and testing iterations.

Further aspects of implementing the second model 534 are described in U.S. patent application Ser. No. 17/340,387.

In an embodiment, such as depicted in FIG. 9, the controller 200 may receive data indicative of an actual mitigated cluster power output 337. The controller 200 may then be configured to determine a degree of deviation 338 between the actual mitigated cluster power output 337 and the potential mitigated cluster power output 516 that corresponds to the mitigation setpoint combination 502. For the turbine cluster 304. As depicted at 340, the degree of deviation 338 may be utilized to further train/revise the first and/or second regression models 458, 544. For example, in an embodiment wherein the actual mitigated cluster power output 337 deviates from the cluster power output predicted based on the mitigation setpoint combination 502, the first and/or second models 434, 534 may be revised. The revision of the first and/or second models 434, 534 may improve a correlation between the actual mitigated cluster power output 337 and the predicted/potential mitigated cluster power output 516.

The determination of the wind direction of the wind (W) affecting the wind farm 152, may, in an embodiment, be accomplished via the utilization of an overhead image 342 of at least a portion of the wind farm 152 having a known instant of collection. The overhead image 342 may include an indication of an orientation to a cardinal direction 344. For example, the overhead image 342 may be a satellite image taken at a known instant. Based on the overhead image 342, a yaw angle 346 for each wind turbine 100 pictured may be determined. The yaw angle 346 of each wind turbine may be the angle to which each wind turbine 100 was yawed at instant of collection. It should be appreciated that the yaw angle 346 may, in an embodiment, be oriented relative to a cardinal direction 344.

The controller 200 may, in an embodiment, aggregate the yaw angles 346 for each wind turbine 100 derived from the overhead image 342. The aggregation may generate a consensus yaw angle 348 for the wind farm 152. The consensus yaw angle 348 may correspond to the wind direction of the wind (W) affecting the wind farm 152 at the instant of collection. It should be appreciated that determining the wind direction based on the consensus yaw angle 348 may, for example, mitigate errors that may be attributable to faults and/or misalignments of environmental sensors 156.

In an additional embodiment, the determination of the wind direction of the wind (W) affecting the wind farm 152, may, in an embodiment, be accomplished via an analysis of yaw setpoint 350. As such, the controller 200 may be configured to receive an indication of a yaw setpoint 350 from at least a portion of the plurality of wind turbines 100 of the wind farm 152. The controller may then determine a median yaw setpoint 352 for the plurality of wind turbines 100 based on the received indications. The median yaw setpoint 352 may be indicative of the wind direction. It should be appreciated that determining the wind direction based on the median yaw setpoint 352 may, for example, mitigate errors that may be attributable to faults and/or misalignments of environmental sensors 156.

Further aspects of determining the wind direction based on the median yaw setpoint 352 are described in U.S. patent application Ser. No. 17/027,789. As such, U.S. patent application Ser. No. 17/027,789 entitled "Systems and Methods for Controlling a Wind Turbine" filed Sep. 22, 2020 is incorporated herein by reference in its entirety for all purposes.

Figure 13:
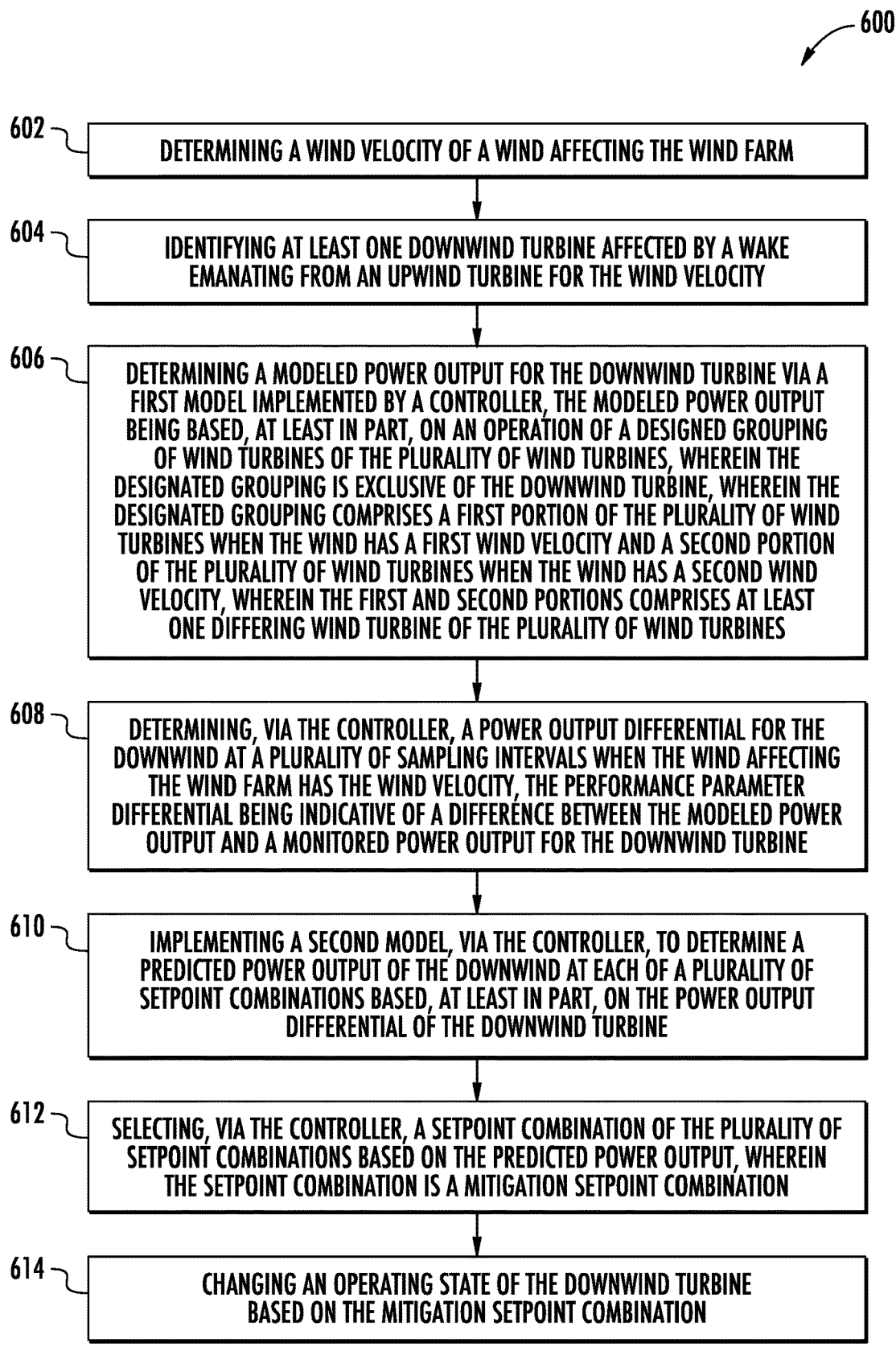
FIG. 13 illustrates a flowchart of a method for operating the wind farm according to the present disclosure.

Referring now to FIG. 13 wherein, a flow diagram of one embodiment of a method 600 for operating a wind farm having a plurality of wind turbines is illustrated. The method 600 may be implemented using the first and second models 434, 534 discussed above with reference to FIGS. 7-12. FIG. 13 depicts steps performed in a particular order for purposes of illustration and discussion. Those of ordinary skill in the art, using the disclosures provided herein, will understand that various steps of the method 600 or any of the other methods disclosed herein may be adapted, modified, rearranged, performed simultaneously or modified in various ways without deviating from the scope of the present disclosure.

As shown at (602), the method 600 may include determining a wind velocity of a wind affecting the wind farm. As shown at (604), the method 600 may include identifying at least one downwind turbine affected by a wake emanating from an upwind turbine for the wind velocity. As shown at (606), method 600 may include determining a modeled power output for the downwind turbine via a first model implemented by a controller. The modeled power output may be based, at least in part, on an operation of a designated grouping of wind turbines of the plurality of wind turbines. The designated grouping may be exclusive of the downwind turbine. The designated grouping may include a first portion of the plurality of wind turbines when the wind has a first wind velocity and a second portion of the plurality of wind turbines when the wind has a second wind velocity. The first and second portions may include at least one differing wind turbine of the plurality of wind turbines. As is further shown at (608), the method 600 may include determining, via the controller, a power output differential for the downwind at a plurality of sampling intervals when the wind affecting the wind farm has the wind velocity. The performance parameter differential may be indicative of a difference between the modeled power output and a monitored power output for the downwind turbine. Additionally, as shown at (610), the method 600 may include implementing a second model, via the controller, to determine a predicted power output of the downwind at each of a plurality of setpoint combinations based, at least in part, on the power output differential of the downwind turbine. As shown at (612), the method 600 may include selecting, via the controller, a setpoint combination of the plurality of setpoint combinations based on the predicted power output. The setpoint combination may be a mitigation setpoint combination. Further, as shown at (614), the method 600 may include changing an operating state of the downwind turbine based on the mitigation setpoint combination.

In an additional embodiment, determining the modeled power output via the method 600 may include generating, via the controller, a correlation score for each of the plurality of wind turbines relative to the downwind turbine. A designated grouping of wind turbines may be formed based, at least in part, on the correlation score for each of the plurality of wind turbines and the wind velocity or the mean power of the designated group. A first training data set may be assembled. The first training data set may include a plurality of operational and environmental variables corresponding at least to the designated grouping of wind turbines monitored at the plurality of sampling intervals and across a plurality of design of experiment (DOE) states wherein the plurality of setpoint combinations are toggled. Additionally, the controller may generate a first regression model configured to predict the modeled power output for the downwind turbine based on the operational and environmental variables corresponding to the designated grouping of wind turbines. Further, the controller may train the first regression model based on the first training data set.

In yet a further embodiment, implementing the second model may include assembling a second training data set. The second training data set may include a plurality of operational and environmental variables and the power output differential for the downwind turbine. The plurality of operational and environmental variables may correspond at least to the designated grouping of wind turbines monitored at the plurality of sampling intervals and DOE states and the downwind turbine. The controller may generate a second regression model configured to determine the predicted power output for the downwind turbine based on the operational and environmental variables, the power output differential, and the wind velocity. Additionally, the controller may train the second regression model based on the second training data set.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a wind farm having a plurality of wind turbines, the method comprising: determining a wind direction of a wind affecting the wind farm; identifying, via a controller, a turbine cluster comprising a subset of the plurality of wind turbines when the wind has the determined wind direction, the subset of wind turbines comprising at least an upwind turbine and a downwind turbine, wherein the downwind turbine is affected by a wake emanating from the upwind turbine; determining, via the controller, a difference between a freestream maximal cluster power output and a wake affected cluster power output for the turbine cluster based, at least in part, on a given wind speed affecting the wind farm; determining, via the controller, a mitigation setpoint combination for the subset of wind turbines, the mitigation setpoint combination being configured to establish a mitigated cluster power output, the mitigated cluster power output having a difference from the freestream maximal cluster power output that is less than the difference between the freestream maximal cluster power output and the wake affected cluster power output for the turbine cluster; and changing an operating state of at least one wind turbine of the turbine cluster based on the mitigation setpoint combination.

Clause 2. The method of any preceding clause, wherein the turbine cluster has a first subset of wind turbines and a first upwind turbine when the wind has a first wind velocity and a second subset of wind turbines and a second upwind turbine when the wind has a second wind velocity, wherein the first and second upwind turbines correspond to different wind turbines of the plurality of wind turbines.

Clause 3. The method of any preceding clause, wherein the turbine cluster is one of a plurality of turbine clusters of the wind farm for the determined wind direction.

Clause 4. The method of any preceding clause, wherein determining the mitigation setpoint combination for the subset of wind turbines configured to establish the mitigated cluster power output further comprises: determining, via the controller, a mitigation setpoint combination for at least one wind turbine of the turbine cluster, the mitigation setpoint combination being different than a maximal power setpoint combination for the at least one wind turbine, wherein the mitigation setpoint combination corresponds to a mitigated turbine power output that is less than a freestream maximal turbine power output for the at least one wind turbine, and wherein the mitigated turbine power output corresponds to the mitigated cluster power output that is greater than the wake affected cluster power output.

Clause 5. The method of any preceding clause, wherein determining the difference between the freestream maximal cluster power output and the wake affected cluster power output further comprises: determining, via the controller, the freestream maximal turbine power output for each wind turbine of the turbine cluster for the given wind speed affecting the wind farm, wherein the freestream maximal turbine power output for each wind turbine corresponds to a maximal power setpoint combination for each wind turbine for the given wind speed; and determining, via the controller, the freestream maximal cluster power output by combining the freestream maximal turbine power for each wind turbine of the turbine cluster.

Clause 6. The method of any preceding clause, wherein determining the freestream maximal turbine power output for each wind turbine of the turbine cluster further comprises: receiving, via the controller, an operational data set indicative of a plurality of historical operating parameters of the subset of wind turbines, wherein the operational data set includes historical indications of a pitch setpoint, a tip speed ratio, and a yaw position for the subset of wind turbines at a plurality of sampling intervals; receiving, via the controller, an environmental data set indicative of a plurality of environmental conditions affecting the subset of wind turbines; determining at least one freestream sector for each wind turbine of the subset of wind turbines via an analysis of a windfarm layout and terrain contour, wherein the freestream sector corresponds to an arc in which the wind, of a particular wind velocity, affecting each wind turbine is unobstructed, at least, by an intervening wind turbine; and determining, via the controller, the freestream maximal turbine power output for each wind turbine of the subset of wind turbines based on the operational data set and the environmental data set for wind velocities within the at least one freestream sector.

Clause 7. The method of any preceding clause, wherein determining the difference between the freestream maximal cluster power output and the wake affected cluster power output further comprises: determining, at least one wake sector for the downwind turbine via the analysis of the windfarm layout and the terrain contour, wherein the at least one wake sector corresponds to an arc in which the wind, of the particular wind velocity, affecting the downwind turbine is affected by the upwind turbine; identifying, via the controller, a correlation between a wake affected turbine power output for the downwind turbine, the wind velocity, an operational parameter of the downwind turbine, and an operating state of, at least, the upwind turbine, wherein the operational parameter of the downwind turbine includes a pitch setpoint, a tip speed ratio, and a yaw position of the downwind turbine; determining, via the controller, the wake affected turbine power output for the downwind turbine when the wind velocity corresponds to the at least one wake sector based, at least in part, on the identified correlation; and combining, via the controller, the freestream maximal turbine power output for the upwind turbine with, at least, the wake affected turbine power output of the downwind turbine so as to determine the wake affected cluster power output.

Clause 8. The method of any preceding clause, wherein the analysis of the windfarm layout comprises the generation, via a wake simulation model programmed in the controller, of a plurality of predicted wind flow contours for each wind turbine of the plurality of wind turbines for a plurality of wind velocities, and wherein determining the wake affected turbine power output for the downwind turbine comprises: generating, via the wake simulation model, a predicted wake affected turbine power output for the downwind turbine based, at least in part, on the plurality of predicted wind flow contours.

Clause 9. The method of any preceding clause, wherein the determining of the mitigation setpoint combination for the subset of wind turbines further comprises: generating, via the controller, a cluster power model based, at least in part, on the correlation between the wake affected turbine power output for the downwind turbine and the wind velocity, an operational parameter of the downwind turbine, and an operating state of, at least, the upwind turbine; training, via the controller, the cluster power model via the operational data set and the environmental data set; determining, via the controller, a plurality of potential mitigation setpoint combinations for the subset of wind turbines for the plurality of environmental conditions corresponding to the wake sector based on the cluster power model, each of the plurality of potential mitigation setpoint combinations corresponding to a potential mitigated cluster power output; and selecting, via the cluster power model, one of the plurality of potential mitigation setpoint combinations corresponding to the potential mitigated cluster power output having a magnitude of the difference relative to the freestream maximal cluster power output that is less than the magnitude of the difference for each remaining potential mitigated cluster power output.

Clause 10. The method of any preceding clause, wherein the determining of the mitigation setpoint combination for the subset of wind turbines further comprises: determining, via the controller, a plurality of historical setpoint combinations indicated by the operational data set for each wind turbine of the subset of wind turbines for the particular wind velocity corresponding to the wake sector, wherein the plurality of historical setpoint combinations correspond to a plurality of historical time intervals, and wherein the plurality of historical setpoint combinations are indicative of a plurality of variations in setpoint combinations for each wind turbine of the subset of wind turbines for the particular wind velocity; determining, via the controller, the wake affected cluster power output at each of the plurality of historical time intervals; correlating, via the controller, the wake affected cluster power output at each of the plurality of historical time intervals to each of the plurality of historical setpoint combinations; determining, via the controller, a historical setpoint combination of the plurality of historical setpoint combinations corresponding to the wake affected cluster power output having a magnitude of the difference from the freestream maximal cluster power output that is less than the magnitude of the difference for each remaining wake affected cluster power output at each of the remaining plurality of historical time intervals; and determining, via the controller, the mitigation setpoint combination based, at least in part, on the determined historical setpoint combination.

Clause 11. The method of any preceding clause, wherein determining the difference between the freestream maximal cluster power output and the wake affected cluster power output further comprises: determining a modeled performance parameter for each wind turbine of the subset of wind turbines via a first model implemented by the controller, each modeled performance parameter being based, at least in part, on an operation of a designated grouping of a plurality of designated groupings of wind turbines of the plurality of wind turbines, wherein each designated grouping of the plurality of designated groupings corresponds to one wind turbine of the subset of wind turbines and is exclusive of the subset of wind turbines; correlating, via the controller, the modeled performance parameter for each wind turbine to a plurality of wind velocities; determining, via the controller, at least one freestream sector for each wind turbine of the subset of wind turbines wherein a monitored performance parameter for each wind turbine of the subset of wind turbines has a deviation from the modeled performance parameter that is less than a deviation threshold, wherein the deviation from the modeled performance parameter that is less than the deviation threshold is indicative of a turbine power output corresponding to the freestream maximal turbine power output for each wind turbine of the turbine cluster, and wherein the freestream sector corresponds to an arc in which the wind affecting each wind turbine is unobstructed, at least, by an intervening wind turbine; determining, via the controller, at least one wake sector for the downwind turbine, the at least one wake sector corresponding to an arc in which the wind affecting the downwind turbine is affected by the upwind turbine so that the monitored performance parameter of the downwind turbine has a deviation from the modeled performance parameter that exceeds the deviation threshold, wherein the deviation from the modeled performance parameter that is greater than the deviation threshold is indicative of the turbine power output corresponding to a wake affected turbine power output for the downwind turbine; determining, via the controller, the freestream maximal cluster power output by combining the freestream maximal turbine power output for each wind turbine of the turbine cluster; and combining, via the controller, the freestream maximal turbine power output for the upwind turbine with, at least, the wake affected turbine power output of the downwind turbine so as to determine the wake affected cluster power output.

Clause 12. The method of any preceding clause, wherein determining the modeled performance parameter via the first model further comprises: generating, via the controller, a correlation score for each of the plurality of wind turbines of the wind farm relative to each wind turbine of the subset of wind turbines; forming the plurality of designated groupings of wind turbines based, at least in part, on the correlation score for each of the plurality of wind turbines; assembling a first training data set comprising a plurality of operational and environmental variables corresponding at least to the plurality of designated grouping of wind turbines monitored at a plurality of sampling intervals and across a plurality of design of experiment (DOE) states wherein a plurality of setpoint combinations are toggled; generating, via the controller, a first regression model configured to predict the modeled performance parameter for each wind turbine of the subset of wind turbines based on the operational and environmental variables corresponding to the plurality of designated groupings of wind turbines; and training, via the controller, the first regression model based on the first training data set.

Clause 13. The method of any preceding clause, wherein the determining of the mitigation setpoint combination for the subset of wind turbines further comprises: implementing a second model, via the controller, to determine a potential mitigated turbine power output for each wind turbine of the subset of wind turbines at each of a plurality of potential mitigation setpoint combinations based, at least in part, on the modeled performance parameter for each wind turbine of the subset of wind turbines for the wind velocity; determining, via the controller, a potential mitigated cluster power output for each of the plurality of potential mitigation setpoint combinations based, at least in part, on the corresponding potential mitigated turbine power output for each wind turbine; and selecting, via the controller, the mitigated setpoint combination from the plurality of setpoint combinations corresponding to the potential mitigated cluster power output having a magnitude of the difference relative to the freestream maximal cluster power output that is less than the magnitude of the difference for each remaining potential mitigated cluster power output.

Clause 14. The method of any preceding clause, wherein implementing the second model further comprises: assembling a second training data set comprising a plurality of operational and environmental variables corresponding at least to the plurality of designated grouping of wind turbines and each respective wind turbine of the subset of wind turbines monitored at a plurality of sampling intervals and across a plurality of design of experiment (DOE) states wherein a plurality of setpoint combinations are toggled; generating, via the controller, a second regression model configured to determine the mitigated turbine power output for each wind turbine of the subset of wind turbines based on the operational and environmental variables and the modeled performance parameter; and training, via the controller, the second regression model based on the second training data set and the modeled performance parameters for each wind turbine of the subset of wind turbines.

Clause 15. The method of any preceding clause, further comprising: receiving, via the controller, data indicative of an actual mitigated cluster power output generated based on the mitigated setpoint combination; determining, via the controller, a degree of deviation between the actual mitigated cluster power output and the potential mitigated cluster power output corresponding to the mitigation setpoint combination; and training at least one of the first or second models based on the degree of deviation.

Clause 16. The method of any preceding clause, wherein determining the wind direction of the wind affecting the wind farm further comprises: determining a yaw angle for each wind turbine of the plurality of wind turbines based on an overhead image of the wind farm having a known instant of collection; and aggregating, via the controller, the yaw angle for each wind turbine of the plurality wind turbines to generate a consensus yaw angle for the wind farm, the consensus yaw angle corresponding to the wind direction of the wind affecting the wind farm at the instant of collection.

Clause 17. The method of any preceding clause, wherein determining the wind direction of the wind affecting the wind turbine further comprises: receiving, via the controller, an indication of a yaw set point from at least a portion of the plurality of wind turbines of the wind farm; and determining, via the controller, a median yaw setpoint based on the received indications, the median yaw setpoint being indicative of the wind direction.

Clause 18. A method for operating a wind farm having a plurality of wind turbines, the method comprising: determining a wind velocity of a wind affecting the wind farm; identifying at least one downwind turbine affected by a wake emanating from an upwind turbine for the wind velocity; determining a modeled power output for the downwind turbine via a first model implemented by a controller, the modeled power output being based, at least in part, on an operation of a designated grouping of wind turbines of the plurality of wind turbines, wherein the designated grouping is exclusive of the downwind turbine, wherein the designated grouping comprises a first portion of the plurality of wind turbines when the wind has a first wind velocity and a second portion of the plurality of wind turbines when the wind has a second wind velocity, wherein the first and second portions comprises at least one differing wind turbine of the plurality of wind turbines; determining, via the controller, a power output differential for the downwind turbine at a plurality of sampling intervals when the wind affecting the wind farm has the wind velocity, the performance parameter differential being indicative of a difference between the modeled power output and a monitored power output for the downwind turbine; implementing a second model, via the controller, to determine a predicted power output of the downwind turbine at each of a plurality of setpoint combinations based, at least in part, on the power output differential of the downwind turbine; selecting, via the controller, a setpoint combination of the plurality of setpoint combinations based on the predicted power output, wherein the setpoint combination is a mitigation setpoint combination; and changing an operating state of the downwind turbine based on the mitigation setpoint combination.

Clause 19. The method of any preceding clause, wherein determining the modeled power output further comprises: generating, via the controller, a correlation score for each of the plurality of wind turbines relative to the downwind turbine; forming the designated grouping of wind turbines based, at least in part, on the correlation score for each of the plurality of wind turbines and the wind velocity or mean power of the designated group; assembling a first training data set comprising a plurality of operational and environmental variables corresponding at least to the designated grouping of wind turbines monitored at the plurality of sampling intervals and across a plurality of design of experiment (DOE) states wherein the plurality of setpoint combinations are toggled; generating, via the controller, a first regression model configured to predict the modeled power output for the downwind turbine based on the operational and environmental variables corresponding to the designated grouping of wind turbines; and training, via the controller, the first regression model based on the first training data set.

Clause 20. The method of any preceding clause, wherein implementing the second model further comprises: assembling a second training data set comprising a plurality of operational and environmental variables and the power output differential for the downwind turbine, the plurality of operational and environmental variables corresponding at least to the designated grouping of wind turbines monitored at the plurality of sampling intervals and DOE states and the downwind turbine; generating, via the controller, a second regression model configured to determine the predicted power output for the downwind turbine based on the operational and environmental variables, the power output differential, and the wind velocity; and training, via the controller, the second regression model based on the second training data set.

What is claimed is:

1. A method for operating a wind farm having a plurality of wind turbines, the method comprising:
    determining a wind direction of a wind affecting the wind farm;
    identifying, via a controller, a turbine cluster comprising a subset of the plurality of wind turbines when the wind has the determined wind direction, the subset of wind turbines comprising at least an upwind turbine and a downwind turbine, wherein the downwind turbine is affected by a wake emanating from the upwind turbine;
    determining, via the controller, a difference between a freestream maximal cluster power output and a wake affected cluster power output for the turbine cluster based, at least in part, on a given wind speed affecting the wind farm;
    determining, via the controller, a mitigation setpoint combination for the subset of wind turbines, the mitigation setpoint combination being configured to establish a mitigated cluster power output, the mitigated cluster power output having a difference from the freestream maximal cluster power output that is less than the difference between the freestream maximal cluster power output and the wake affected cluster power output for the turbine cluster, wherein the determining of the mitigation setpoint combination for the subset of wind turbines further comprises:
        generating, via the controller, a cluster power model based, at least in part, on a correlation between a wake affected turbine power output for the downwind turbine and a wind velocity, an operational parameter of the downwind turbine, and an operating state of, at least, the upwind turbine;
        training, via the controller, the cluster power model via at least one of an operational data set or an environmental data set;
        determining, via the controller, a plurality of potential mitigation setpoint combinations for the subset of wind turbines for a plurality of environmental conditions corresponding to at least one wake sector based on the cluster power model, each of the plurality of potential mitigation setpoint combinations corresponding to a potential mitigated cluster power output; and
        selecting, via the cluster power model, one of the plurality of potential mitigation setpoint combinations corresponding to the potential mitigated cluster power output having a magnitude of the difference relative to the freestream maximal cluster power output that is less than the magnitude of the difference for each remaining potential mitigated cluster power output; and
    changing an operating state of at least one wind turbine of the turbine cluster based on the mitigation setpoint combination.

2. The method of claim 1, wherein the turbine cluster has a first subset of wind turbines and a first upwind turbine when the wind has a first wind velocity and a second subset of wind turbines and a second upwind turbine when the wind has a second wind velocity, wherein the first and second upwind turbines correspond to different wind turbines of the plurality of wind turbines.

3. The method of claim 1, wherein the turbine cluster is one of a plurality of turbine clusters of the wind farm for the determined wind direction.

4. The method of claim 1, wherein determining the mitigation setpoint combination for the subset of wind turbines configured to establish the mitigated cluster power output further comprises:
   determining, via the controller, a mitigation setpoint combination for at least one wind turbine of the turbine cluster, the mitigation setpoint combination being different than a maximal power setpoint combination for the at least one wind turbine, wherein the mitigation setpoint combination corresponds to a mitigated turbine power output that is less than a freestream maximal turbine power output for the at least one wind turbine, and wherein the mitigated turbine power output corresponds to the mitigated cluster power output that is greater than the wake affected cluster power output.

5. The method of claim 4, wherein determining the difference between the freestream maximal cluster power output and the wake affected cluster power output further comprises:
   determining, via the controller, the freestream maximal turbine power output for each wind turbine of the turbine cluster for the given wind speed affecting the wind farm, wherein the freestream maximal turbine power output for each wind turbine corresponds to a maximal power setpoint combination for each wind turbine for the given wind speed; and
   determining, via the controller, the freestream maximal cluster power output by combining the freestream maximal turbine power for each wind turbine of the turbine cluster.

6. The method of claim 5, wherein determining the freestream maximal turbine power output for each wind turbine of the turbine cluster further comprises:
   receiving, via the controller, the operational data set indicative of a plurality of historical operating parameters of the subset of wind turbines, wherein the operational data set includes historical indications of a pitch setpoint, a tip speed ratio, and a yaw position for the subset of wind turbines at a plurality of sampling intervals;
   receiving, via the controller, the environmental data set indicative of a plurality of environmental conditions affecting the subset of wind turbines;
   determining at least one freestream sector for each wind turbine of the subset of wind turbines via an analysis of a windfarm layout and terrain contour, wherein the freestream sector corresponds to an arc in which the wind, of a particular wind velocity, affecting each wind turbine is unobstructed, at least, by an intervening wind turbine; and
   determining, via the controller, the freestream maximal turbine power output for each wind turbine of the subset of wind turbines based on the operational data set and the environmental data set for wind velocities within the at least one freestream sector.

7. The method of claim 6, wherein determining the difference between the freestream maximal cluster power output and the wake affected cluster power output further comprises:
   determining, at least one wake sector for the downwind turbine via the analysis of the windfarm layout and the terrain contour, wherein the at least one wake sector corresponds to an arc in which the wind, of the particular wind velocity, affecting the downwind turbine is affected by the upwind turbine;
   identifying, via the controller, a correlation between a wake affected turbine power output for the downwind turbine, the wind velocity, an operational parameter of the downwind turbine, and an operating state of, at least, the upwind turbine, wherein the operational parameter of the downwind turbine includes a pitch setpoint, a tip speed ratio, and a yaw position of the downwind turbine;
   determining, via the controller, the wake affected turbine power output for the downwind turbine when the wind velocity corresponds to the at least one wake sector based, at least in part, on the identified correlation; and
   combining, via the controller, the freestream maximal turbine power output for the upwind turbine with, at least, the wake affected turbine power output of the downwind turbine so as to determine the wake affected cluster power output.

8. The method of claim 7, wherein the analysis of the windfarm layout comprises the generation, via a wake simulation model programmed in the controller, of a plurality of predicted wind flow contours for each wind turbine of the plurality of wind turbines for a plurality of wind velocities, and wherein determining the wake affected turbine power output for the downwind turbine comprises:
   generating, via the wake simulation model, a predicted wake affected turbine power output for the downwind turbine based, at least in part, on the plurality of predicted wind flow contours.

9. The method of claim 7, wherein the determining of the mitigation setpoint combination for the subset of wind turbines further comprises:
   determining, via the controller, a plurality of historical setpoint combinations indicated by the operational data set for each wind turbine of the subset of wind turbines for the particular wind velocity corresponding to the at least one wake sector, wherein the plurality of historical setpoint combinations correspond to a plurality of historical time intervals, and wherein the plurality of historical setpoint combinations are indicative of a plurality of variations in setpoint combinations for each wind turbine of the subset of wind turbines for the particular wind velocity;
   determining, via the controller, the wake affected cluster power output at each of the plurality of historical time intervals;
   correlating, via the controller, the wake affected cluster power output at each of the plurality of historical time intervals to each of the plurality of historical setpoint combinations;
   determining, via the controller, a historical setpoint combination of the plurality of historical setpoint combinations corresponding to the wake affected cluster power output having a magnitude of the difference from the freestream maximal cluster power output that is less than the magnitude of the difference for each remaining wake affected cluster power output at each of the remaining plurality of historical time intervals; and determining, via the controller, the mitigation setpoint combination based, at least in part, on the determined historical setpoint combination.

10. The method of claim 4, wherein determining the difference between the freestream maximal cluster power output and the wake affected cluster power output further comprises:

determining a modeled performance parameter for each wind turbine of the subset of wind turbines via a first model implemented by the controller, each modeled performance parameter being based, at least in part, on an operation of a designated grouping of a plurality of designated groupings of wind turbines of the plurality of wind turbines, wherein each designated grouping of the plurality of designated groupings corresponds to one wind turbine of the subset of wind turbines and is exclusive of the subset of wind turbines;

correlating, via the controller, the modeled performance parameter for each wind turbine to a plurality of wind velocities;

determining, via the controller, at least one freestream sector for each wind turbine of the subset of wind turbines wherein a monitored performance parameter for each wind turbine of the subset of wind turbines has a deviation from the modeled performance parameter that is less than a deviation threshold, wherein the deviation from the modeled performance parameter that is less than the deviation threshold is indicative of a turbine power output corresponding to the freestream maximal turbine power output for each wind turbine of the turbine cluster, and wherein the freestream sector corresponds to an arc in which the wind affecting each wind turbine is unobstructed, at least, by an intervening wind turbine;

determining, via the controller, at least one wake sector for the downwind turbine, the at least one wake sector corresponding to an arc in which the wind affecting the downwind turbine is affected by the upwind turbine so that the monitored performance parameter of the downwind turbine has a deviation from the modeled performance parameter that exceeds the deviation threshold, wherein the deviation from the modeled performance parameter that is greater than the deviation threshold is indicative of the turbine power output corresponding to a wake affected turbine power output for the downwind turbine;

determining, via the controller, the freestream maximal cluster power output by combining the freestream maximal turbine power output for each wind turbine of the turbine cluster; and combining, via the controller, the freestream maximal turbine power output for the upwind turbine with, at least, the wake affected turbine power output of the downwind turbine so as to determine the wake affected cluster power output.

11. The method of claim 10, wherein determining the modeled performance parameter via the first model further comprises:

generating, via the controller, a correlation score for each of the plurality of wind turbines of the wind farm relative to each wind turbine of the subset of wind turbines;

forming the plurality of designated groupings of wind turbines based, at least in part, on the correlation score for each of the plurality of wind turbines;

assembling a first training data set comprising a plurality of operational and environmental variables corresponding at least to the plurality of designated grouping of wind turbines monitored at a plurality of sampling intervals and across a plurality of design of experiment (DOE) states wherein a plurality of setpoint combinations are toggled;

generating, via the controller, a first regression model configured to predict the modeled performance parameter for each wind turbine of the subset of wind turbines based on the operational and environmental variables corresponding to the plurality of designated groupings of wind turbines; and training, via the controller, the first regression model based on the first training data set.

12. The method of claim 10, wherein the determining of the mitigation setpoint combination for the subset of wind turbines further comprises:

implementing a second model, via the controller, to determine a potential mitigated turbine power output for each wind turbine of the subset of wind turbines at each of a plurality of potential mitigation setpoint combinations based, at least in part, on the modeled performance parameter for each wind turbine of the subset of wind turbines for the wind velocity;

determining, via the controller, a potential mitigated cluster power output for each of the plurality of potential mitigation setpoint combinations based, at least in part, on the corresponding potential mitigated turbine power output for each wind turbine; and selecting, via the controller, the mitigated setpoint combination from the plurality of setpoint combinations corresponding to the potential mitigated cluster power output having a magnitude of the difference relative to the freestream maximal cluster power output that is less than the magnitude of the difference for each remaining potential mitigated cluster power output.

13. The method of claim 12, wherein implementing the second model further comprises:

assembling a second training data set comprising a plurality of operational and environmental variables corresponding at least to the plurality of designated grouping of wind turbines and each respective wind turbine of the subset of wind turbines monitored at a plurality of sampling intervals and across a plurality of design of experiment (DOE) states wherein a plurality of setpoint combinations are toggled;

generating, via the controller, a second regression model configured to determine the mitigated turbine power output for each wind turbine of the subset of wind turbines based on the operational and environmental variables and the modeled performance parameter; and training, via the controller, the second regression model based on the second training data set and the modeled performance parameters for each wind turbine of the subset of wind turbines.

14. The method of claim 13, further comprising:

receiving, via the controller, data indicative of an actual mitigated cluster power output generated based on the mitigated setpoint combination;

determining, via the controller, a degree of deviation between the actual mitigated cluster power output and the potential mitigated cluster power output corresponding to the mitigation setpoint combination; and training at least one of the first or second models based on the degree of deviation.

15. The method of claim 1, wherein determining the wind direction of the wind affecting the wind farm further comprises:
   determining a yaw angle for each wind turbine of the plurality of wind turbines based on an overhead image of the wind farm having a known instant of collection; and
   aggregating, via the controller, the yaw angle for each wind turbine of the plurality wind turbines to generate a consensus yaw angle for the wind farm, the consensus yaw angle corresponding to the wind direction of the wind affecting the wind farm at the instant of collection.

16. The method of claim 1, wherein determining the wind direction of the wind affecting the wind turbine further comprises:
   receiving, via the controller, an indication of a yaw set point from at least a portion of the plurality of wind turbines of the wind farm; and
   determining, via the controller, a median yaw setpoint based on the received indications, the median yaw setpoint being indicative of the wind direction.

* * * * *